United States Patent
Khazeni et al.

(10) Patent No.: US 7,898,723 B2
(45) Date of Patent: Mar. 1, 2011

(54) MICROELECTROMECHANICAL SYSTEMS DISPLAY ELEMENT WITH PHOTOVOLTAIC STRUCTURE

(75) Inventors: Kasra Khazeni, San Jose, CA (US); Manish Kothari, Cupertino, CA (US); Ion Bita, San Jose, CA (US); Marek Mienko, San Jose, CA (US); Gang Xu, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 390 days.

(21) Appl. No.: 12/061,312

(22) Filed: Apr. 2, 2008

(65) Prior Publication Data

US 2009/0251761 A1  Oct. 8, 2009

(51) Int. Cl.
G02B 26/00 (2006.01)
G02B 26/08 (2006.01)
G02F 1/29 (2006.01)

(52) U.S. Cl. .......................... 359/291; 359/298
(58) Field of Classification Search .......... 359/290–292, 359/298
See application file for complete search history.

(56) References Cited

U.S. PATENT DOCUMENTS

| | | | |
|---|---|---|---|
| 3,247,332 A | 4/1966 | Thelen | |
| 3,728,030 A | 4/1973 | Hawes | |
| 3,886,310 A | 5/1975 | Guldberg | |
| 3,955,190 A | 5/1976 | Teraishi | |
| 4,200,472 A | 4/1980 | Chappell et al. | |
| 4,403,248 A | 9/1983 | te Velde | |
| 4,421,381 A | 12/1983 | Ueda et al. | |
| 4,441,789 A | 4/1984 | Pohlack | |
| 4,441,791 A | 4/1984 | Hornbeck | |
| 4,498,953 A | 2/1985 | Cook et al. | |
| 4,560,435 A | 12/1985 | Brown et al. | |
| 4,633,031 A | 12/1986 | Todorof | |
| 4,655,554 A | 4/1987 | Armitage | |
| 4,786,128 A | 11/1988 | Birnbach | |

(Continued)

FOREIGN PATENT DOCUMENTS

DE  10329917  2/2005

(Continued)

OTHER PUBLICATIONS

Pape et al., Characteristics of the deformable mirror device for optical information processing, Optical Engineering, 22(6):676-681, Nov.-Dec. 1983.

(Continued)

*Primary Examiner* — Joseph Martinez
*Assistant Examiner* — Brandi N Thomas
(74) *Attorney, Agent, or Firm* — Knobbe, Martens, Olson & Bear, LLP

(57) ABSTRACT

A microelectromechanical systems (MEMS) display element may include a photovoltaic structure configured to generate electric energy from incident light. In one embodiment, the display element includes a first layer that is at least partially transmissive of light, a second layer that is at least partially reflective of light, and a photovoltaic element that is formed on the first layer or the second layer or formed between the first layer and the second layer. The second layer is spaced from the first layer and is selectably movable between a first position in which the display element has a first reflectivity and a second position in which the display element has a second reflectivity. The first reflectivity is greater than the second reflectivity. The photovoltaic element is at least partially absorptive of light and is configured to convert a portion of the absorbed light into electric energy, at least when the second layer is in the second position.

30 Claims, 15 Drawing Sheets

U.S. PATENT DOCUMENTS

| | | | |
|---|---|---|---|
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zahowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,559,358 A | 9/1996 | Burns et al. |
| 5,561,523 A | 10/1996 | Blomberg et al. |
| 5,636,052 A | 6/1997 | Arney et al. |
| 5,646,729 A | 7/1997 | Koskinen et al. |
| 5,646,768 A | 7/1997 | Kaeiyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | Goosen |
| 5,719,068 A | 2/1998 | Suzawa et al. |
| 5,734,177 A | 3/1998 | Sakamoto |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | Goosen |
| 5,838,484 A | 11/1998 | Goossen et al. |
| 5,867,302 A | 2/1999 | Fleming |
| 5,886,688 A | 3/1999 | Fifield et al. |
| 5,914,804 A | 6/1999 | Goossen |
| 5,920,418 A | 7/1999 | Shiono et al. |
| 5,961,848 A | 10/1999 | Jacquet et al. |
| 6,028,689 A | 2/2000 | Michalicek et al. |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,242,932 B1 | 6/2001 | Hembree |
| 6,262,697 B1 | 7/2001 | Stephenson |
| 6,300,558 B1 | 10/2001 | Takamoto et al. |
| 6,323,923 B1 | 11/2001 | Hoshino et al. |
| 6,327,071 B1 | 12/2001 | Kimura |
| 6,335,235 B1 | 1/2002 | Bhekla et al. |
| 6,356,378 B1 | 2/2002 | Huibers |
| 6,377,233 B2 | 4/2002 | Colgan et al. |
| 6,384,952 B1 | 5/2002 | Clark et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,518,944 B1 | 2/2003 | Doane et al. |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,794,119 B2 | 9/2004 | Miles |
| 6,813,059 B2 | 11/2004 | Hunter et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,980,350 B2 | 12/2005 | Hung et al. |
| 6,982,820 B2 | 1/2006 | Tsai |
| 6,983,820 B2 | 1/2006 | Tsai |
| 7,006,272 B2 | 2/2006 | Tsai |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,195 B2 | 2/2007 | Yang |
| 7,184,202 B2 | 2/2007 | Miles et al. |
| 7,198,873 B2 | 4/2007 | Lin et al. |
| 7,221,495 B2 | 5/2007 | Miles et al. |
| 7,236,284 B2 | 6/2007 | Miles |
| 7,245,285 B2 | 7/2007 | Yeh et al. |
| 7,289,259 B2 | 10/2007 | Chui et al. |
| 7,302,157 B2 | 11/2007 | Chui |
| 7,321,456 B2 | 1/2008 | Cummings |
| 7,321,457 B2 | 1/2008 | Heald |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,420,725 B2 | 9/2008 | Kothari |
| 7,436,573 B2 | 10/2008 | Doan et al. |
| 7,459,402 B2 | 12/2008 | Doan et al. |
| 7,535,621 B2 | 5/2009 | Chiang |
| 7,566,664 B2 | 7/2009 | Yan et al. |
| 7,569,488 B2 | 8/2009 | Rafanan |
| 7,612,933 B2 | 10/2009 | Kostadin |
| 7,629,197 B2 | 12/2009 | Luo et al. |
| 7,701,029 B2 | 4/2010 | Mabuchi |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kudrle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0202265 A1 | 10/2003 | Reboa et al. |
| 2003/0202266 A1 | 10/2003 | Ring et al. |
| 2003/0213514 A1 | 11/2003 | Ortabasi |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |

| | | |
|---|---|---|
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0168849 A1 | 8/2005 | Lin |
| 2005/0179378 A1 | 8/2005 | Oooka et al. |
| 2005/0195462 A1 | 9/2005 | Lin |
| 2005/0225686 A1 | 10/2005 | Brummack et al. |
| 2005/0249966 A1 | 11/2005 | Tung et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066926 A1 | 3/2006 | Chui et al. |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0079048 A1 | 4/2006 | Sampsell |
| 2006/0082863 A1 | 4/2006 | Piehl et al. |
| 2006/0130889 A1 | 6/2006 | Li et al. |
| 2006/0201546 A1 | 9/2006 | Yokoyama |
| 2006/0220160 A1 | 10/2006 | Miles |
| 2006/0262126 A1 | 11/2006 | Miles |
| 2006/0262380 A1 | 11/2006 | Miles |
| 2006/0268388 A1 | 11/2006 | Miles |
| 2006/0274398 A1 | 12/2006 | Chou |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0121118 A1 | 5/2007 | Gally et al. |
| 2007/0138608 A1 | 6/2007 | Ikehashi |
| 2007/0171418 A1 | 7/2007 | Nyhart |
| 2007/0177247 A1 | 8/2007 | Miles |
| 2007/0194630 A1 | 8/2007 | Mingard et al. |
| 2007/0216987 A1 | 9/2007 | Hagood et al. |
| 2007/0235072 A1 | 10/2007 | Bermel et al. |
| 2007/0279729 A1 | 12/2007 | Kothari et al. |
| 2007/0285761 A1 | 12/2007 | Zhong et al. |
| 2008/0002299 A1 | 1/2008 | Thurn |
| 2008/0013144 A1 | 1/2008 | Chui et al. |
| 2008/0013145 A1 | 1/2008 | Chui et al. |
| 2008/0013154 A1 | 1/2008 | Chui |
| 2008/0030657 A1 | 2/2008 | Wu et al. |
| 2008/0037093 A1 | 2/2008 | Miles |
| 2008/0055705 A1 | 3/2008 | Kothari |
| 2008/0055706 A1 | 3/2008 | Chui et al. |
| 2008/0055707 A1 | 3/2008 | Kogut et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0112035 A1 | 5/2008 | Cummings |
| 2008/0112036 A1 | 5/2008 | Cummings |
| 2008/0186581 A1 | 8/2008 | Bita et al. |
| 2008/0239455 A1 | 10/2008 | Kogut et al. |
| 2008/0247028 A1 | 10/2008 | Chui et al. |
| 2008/0278787 A1 | 11/2008 | Sasagawa |
| 2008/0278788 A1 | 11/2008 | Sasagawa |
| 2008/0297880 A1 | 12/2008 | Steckl et al. |
| 2008/0316566 A1 | 12/2008 | Lan |
| 2008/0316568 A1 | 12/2008 | Griffiths et al. |
| 2009/0009845 A1 | 1/2009 | Endisch et al. |
| 2009/0068781 A1 | 3/2009 | Tung et al. |
| 2009/0073534 A1 | 3/2009 | Lee et al. |
| 2009/0073539 A1 | 3/2009 | Mignard |
| 2009/0080060 A1 | 3/2009 | Sampsell et al. |
| 2009/0101192 A1 | 4/2009 | Kothari et al. |
| 2009/0103161 A1 | 4/2009 | Kothari et al. |
| 2009/0103165 A1 | 4/2009 | Kothari et al. |
| 2009/0103166 A1 | 4/2009 | Khazeni et al. |
| 2009/0135465 A1 | 5/2009 | Chui |
| 2009/0147343 A1 | 6/2009 | Kogut et al. |
| 2009/0201566 A1 | 8/2009 | Kothari |
| 2009/0213450 A1 | 8/2009 | Sampsell |
| 2009/0213451 A1 | 8/2009 | Tung et al. |
| 2009/0225395 A1 | 9/2009 | Ganti et al. |
| 2009/0231666 A1 | 9/2009 | Gudlavalleti et al. |
| 2009/0256218 A1 | 10/2009 | Mignard et al. |
| 2009/0273823 A1 | 11/2009 | Tung et al. |
| 2009/0273824 A1 | 11/2009 | Sasagawa |
| 2009/0279162 A1 | 11/2009 | Chui |
| 2010/0039370 A1 | 2/2010 | Miles |
| 2010/0080890 A1 | 4/2010 | Tung et al. |
| 2010/0085626 A1 | 4/2010 | Tung et al. |
| 2010/0118382 A1 | 5/2010 | Kothari et al. |

FOREIGN PATENT DOCUMENTS

| | | |
|---|---|---|
| EP | 0 668 490 | 8/1995 |
| EP | 1 122 577 | 8/2001 |
| EP | 1 227 346 | 7/2002 |
| EP | 1 275 997 | 1/2003 |
| EP | 1403212 A2 | 3/2004 |
| EP | 1 473 581 | 11/2004 |
| EP | 2012167 A2 | 1/2009 |
| EP | 2051124 A2 | 4/2009 |
| JP | 56-088111 | 7/1981 |
| JP | 60-147718 | 8/1985 |
| JP | 02-151079 | 6/1990 |
| JP | 04-190323 | 7/1992 |
| JP | 04-238321 | 8/1992 |
| JP | 5-49238 | 2/1993 |
| JP | 5-281479 | 10/1993 |
| JP | 8 051230 A | 2/1996 |
| JP | 08-094992 | 4/1996 |
| JP | 09-068722 | 3/1997 |
| JP | 11211999 | 8/1999 |
| JP | 11-295725 | 10/1999 |
| JP | 2002-062490 | 2/2000 |
| JP | 2001-221913 | 8/2001 |
| JP | 2001 249283 | 9/2001 |
| JP | 2001-345458 | 12/2001 |
| JP | 2002-221678 | 8/2002 |
| JP | 2003-340795 | 2/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 334132 A | 12/2007 |
| KR | 2003-0081662 | 10/2003 |
| WO | WO 94/28452 A1 | 12/1994 |
| WO | WO 97/44707 | 11/1997 |
| WO | WO 98/14804 | 4/1998 |
| WO | WO 99/04298 | 1/1999 |
| WO | WO 00/11502 | 3/2000 |
| WO | WO 02/086582 | 10/2002 |
| WO | WO 03/105198 | 12/2003 |
| WO | WO 2006/034377 A2 | 3/2006 |
| WO | WO 2006/137337 | 12/2006 |

| WO | WO 2007/036422 | 4/2007 |
| WO | WO 2007/053438 | 5/2007 |
| WO | WO 2007/072998 | 6/2007 |

OTHER PUBLICATIONS

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Specification for Pathfinder™ Watch (Model No. PAW1300-iV) in worldwide web page for Casio.com, printed on Oct. 20, 2008.

Longhurst, 1963, Chapter IX: Multiple Beam Interferometry, in Geometrical and Physical Optics, pp. 153-157.

Pohlack, Jan. 1, 1983, Grundlagen und anwendungen der induzierten resonanzabsorptoon (teil 1), Feingeraetetechnik, XX, XX, vol. 32, No. 7, pp. 321-326.

Tolansky, 1948, Chapter II: Multiple-Beam Interference, in Multiple-bean Interferometry of Surfaces and Films, Oxford at the Clarendon Press, pp. 8-11.

Conner, "Hybrid Color Display Using Optical Interference Filter Array," SID Digest, pp. 577-580 (1993).

Feenstra et al., Electrowetting displays, Liquivista BV, 16 pp., Jan. 2006.

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. Conf. 6, Jun. 24, 1991, pp. 372-375.

Lezec, Submicrometer dimple array based interference color field displays and sensors, Nano Lett. 7(2):329-333, Dec. 23, 2006.

Miles, A New Reflective FPD Technology Using Interferometric Modulation, Journal of the SID, 5/4, 1997.

Taii et al., "A transparent sheet display by plastic MEMS," Journal of the SID 14(8):735-741, 2006.

International Search Report and Written Opinion for PCT/US2009/038282, dated Oct. 5, 2010, 14 pages.

International Preliminary Report on Patentability for PCT/US2009/038282, dated Oct. 12, 2010, 7 pages.

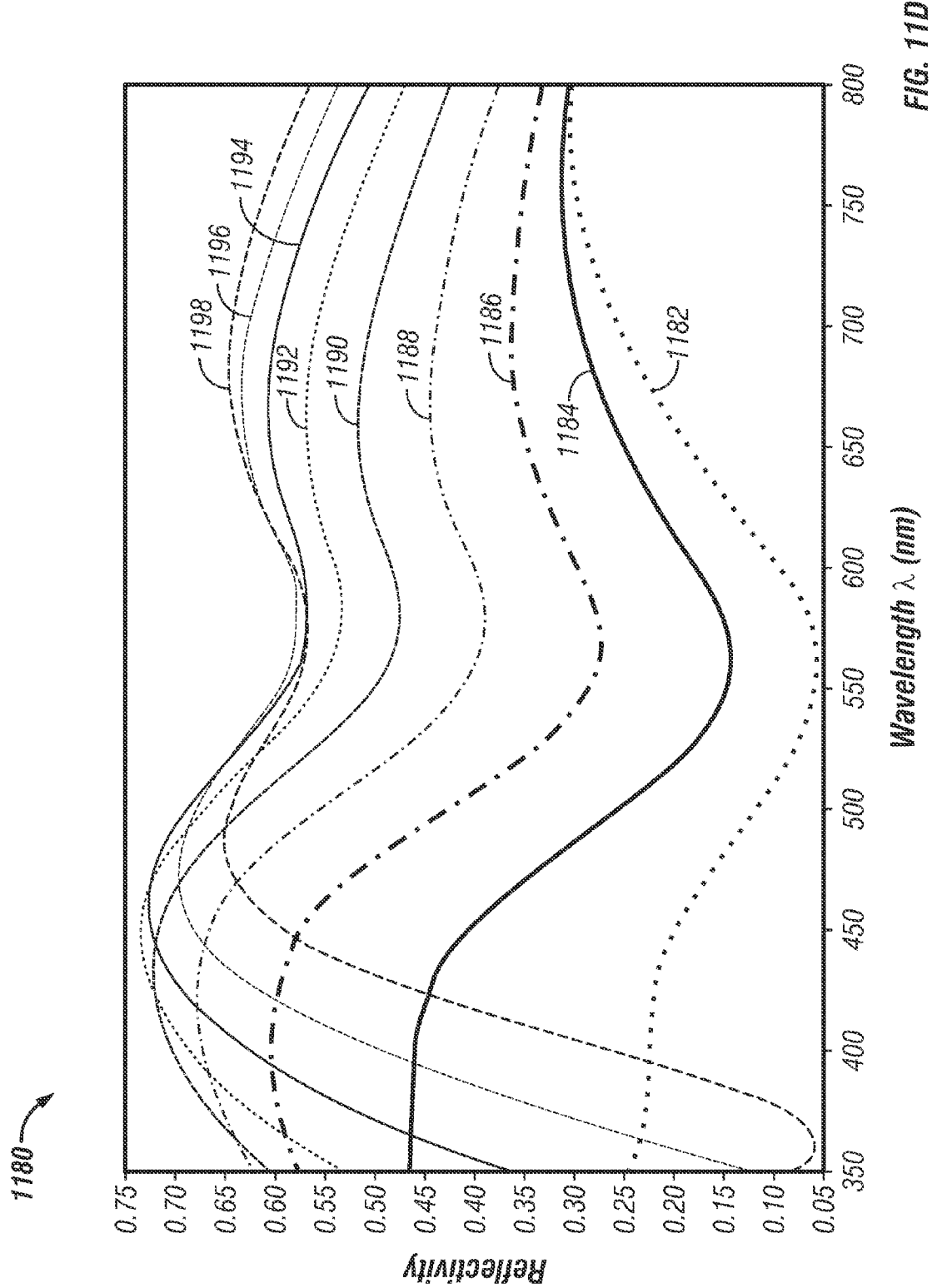

MICROELECTROMECHANICAL SYSTEMS DISPLAY ELEMENT WITH PHOTOVOLTAIC STRUCTURE

BACKGROUND

1. Field

The field of the disclosure relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. As used herein, the term layer refers inclusively to a single layer of a single material and also to a multi-layer of the same or different materials. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

An embodiment of a display element comprises a first layer that is at least partially transmissive of light and a second layer that is at least partially reflective of light. The second layer is spaced from the first layer, and the second layer is selectably movable between a first position in which the display element has a first reflectivity and a second position in which the display element has a second reflectivity. The first reflectivity is greater than the second reflectivity. The display element also comprises a photovoltaic element formed on the first layer or the second layer or formed between the first layer and the second layer. The photovoltaic element is at least partially absorptive of light and is configured to convert a portion of absorbed light into electric energy at least when the second layer is in the second position.

An embodiment of a method of fabricating a microelectromechanical systems (MEMS) display device is provided. The method comprises forming a photovoltaic structure over a substantially transparent substrate, forming a sacrificial layer over the photovoltaic structure, and forming a reflective layer over the sacrificial layer. The method also comprises removing at least a portion of the sacrificial layer below the reflective layer, thereby forming a region into which the reflective layer can be selectively moved.

An embodiment of a method of generating electric energy with a microelectromechanical systems (MEMS) display element is provided. The method comprises providing a display element that comprises a first layer that is at least partially transmissive of light and a second layer that is at least partially reflective of light. The second layer is spaced from the first layer, and the second layer is selectably movable between a first position in which the display element has a first reflectivity and a second position in which the display element has a second reflectivity. The first reflectivity is greater than the second reflectivity. The display element also comprises a photovoltaic element formed on the first layer or the second layer or formed between the first layer and the second layer. The photovoltaic element is at least partially absorptive of light and is configured to convert a portion of absorbed light into electric energy at least when the second layer is in the second position. The method of generating electric energy with the MEMS display element further comprises applying a first voltage to the display element to place the second layer in the first position and generating a first electric energy using the photovoltaic element when the second layer is in the first position. The method further comprises applying a second voltage to the display element to place the second layer in the second position and generating a second electric energy using the photovoltaic element when the second layer is in the second position.

An embodiment of a display device comprises a substrate and a plurality of interferometric modulators formed on the substrate. Each of the interferometric modulators comprises a photovoltaic structure configured to absorb at least a portion of the light incident the interferometric modulator and, in response, to generate electric energy.

An embodiment of an optical display element comprises means for transmitting light and means for partially reflecting light. The partially reflecting means is spaced from the transmitting means, and the partially reflecting means is selectably movable between a first position in which the optical display element has a first reflectivity and a second position in which the optical display element has a second reflectivity. The first reflectivity is greater than the second reflectivity. The optical display element also comprises means for generating electric energy. The generating means is at least partially absorptive of light and is configured for converting a portion of absorbed light into electric energy at least when the partially reflecting means is in the second position. The generating means is formed on the transmitting means or the partially reflecting means or formed between the transmitting means and the partially reflecting means.

In another embodiment, a microelectromechanical systems (MEMS) display device comprises a substrate that is at least partially transmissive to light having one or more wavelengths in a range of wavelengths. The display device also comprises a movable element over the substrate. The movable element is at least partially reflective of light transmitted through the substrate. The movable element is a first distance from the substrate when the device is in a first state and is a second distance from the substrate when the device is in a second state. The first distance is different from the second distance. The display device further comprises a photovoltaic structure between the substrate and the movable element. The photovoltaic structure is configured to absorb at least a portion of the light transmitted through the substrate and, in response, to generate electric energy.

BRIEF DESCRIPTION OF THE DRAWINGS

FIG. 11D shows the modeled reflectivity as a function of wavelength of light (in nanometers) of the display element of FIG. 11C.

DETAILED DESCRIPTION OF PREFERRED EMBODIMENTS

The following detailed description is directed to certain specific embodiments. However, the teachings herein can be embodied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As described further herein, a microelectromechanical systems (MEMS) display element may incorporate a photovoltaic structure configured to generate electric energy from light absorbed by the display element. The generated electric energy may be stored in an electric storage element such as a battery or a capacitor. The stored electric energy may be used to drive the MEMS display element or other electrical components. The photovoltaic structure may include a photovoltaic cell having one or more semiconductor junctions such as, for example, thin-film p-n, p-i-n, and/or metal-semiconductor Schottky junctions. In some embodiments, the display element includes a first layer that is at least partially transmissive of light, a second layer that is at least partially reflective of light, and a photovoltaic element that is formed on the first layer or the second layer or formed between the first layer and the second layer. The second layer is spaced from the first layer and is selectably movable between a first position in which the display element has a first reflectivity and a second position in which the display element has a second reflectivity. The first reflectivity is greater than the second reflectivity. The photovoltaic element is at least partially absorptive of light and is configured to convert a portion of the absorbed light into electric energy, at least when the second layer is in the second position.

Figure 1:
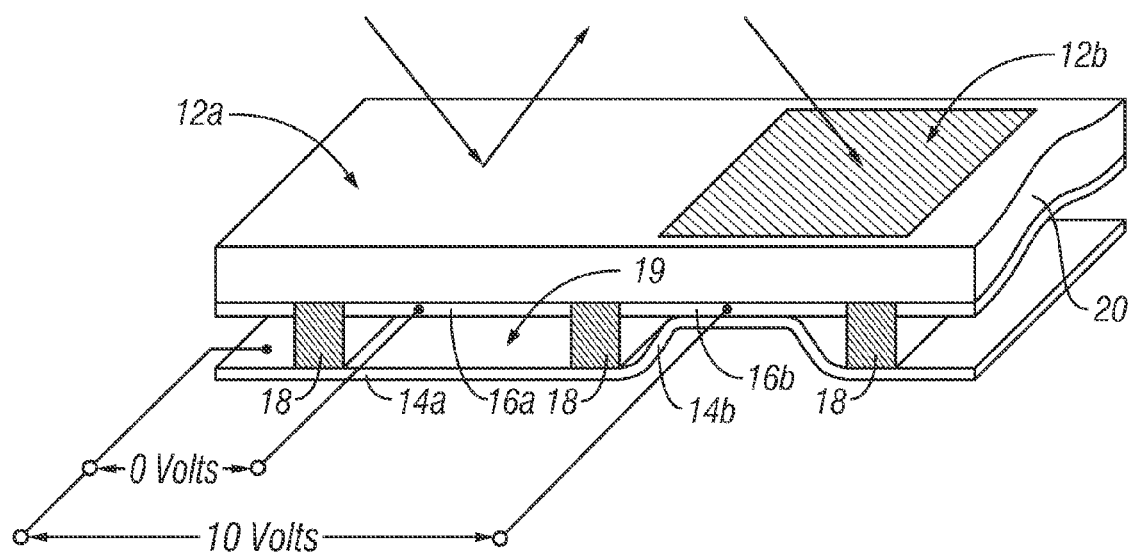
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, may comprise several fused layers, which can include an electrode layer, such as indium tin oxide (ITO), a partially reflective and absorptive layer, such as chromium, and a transparent dielectric. The optical stack 16 is thus electrically conductive, partially transparent, selectively absorptive, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in LCD and other display technologies.

FIGS. 2 through 5B illustrate one exemplary process and system for using an array of interferometric modulators in a display application.

Figure 2:
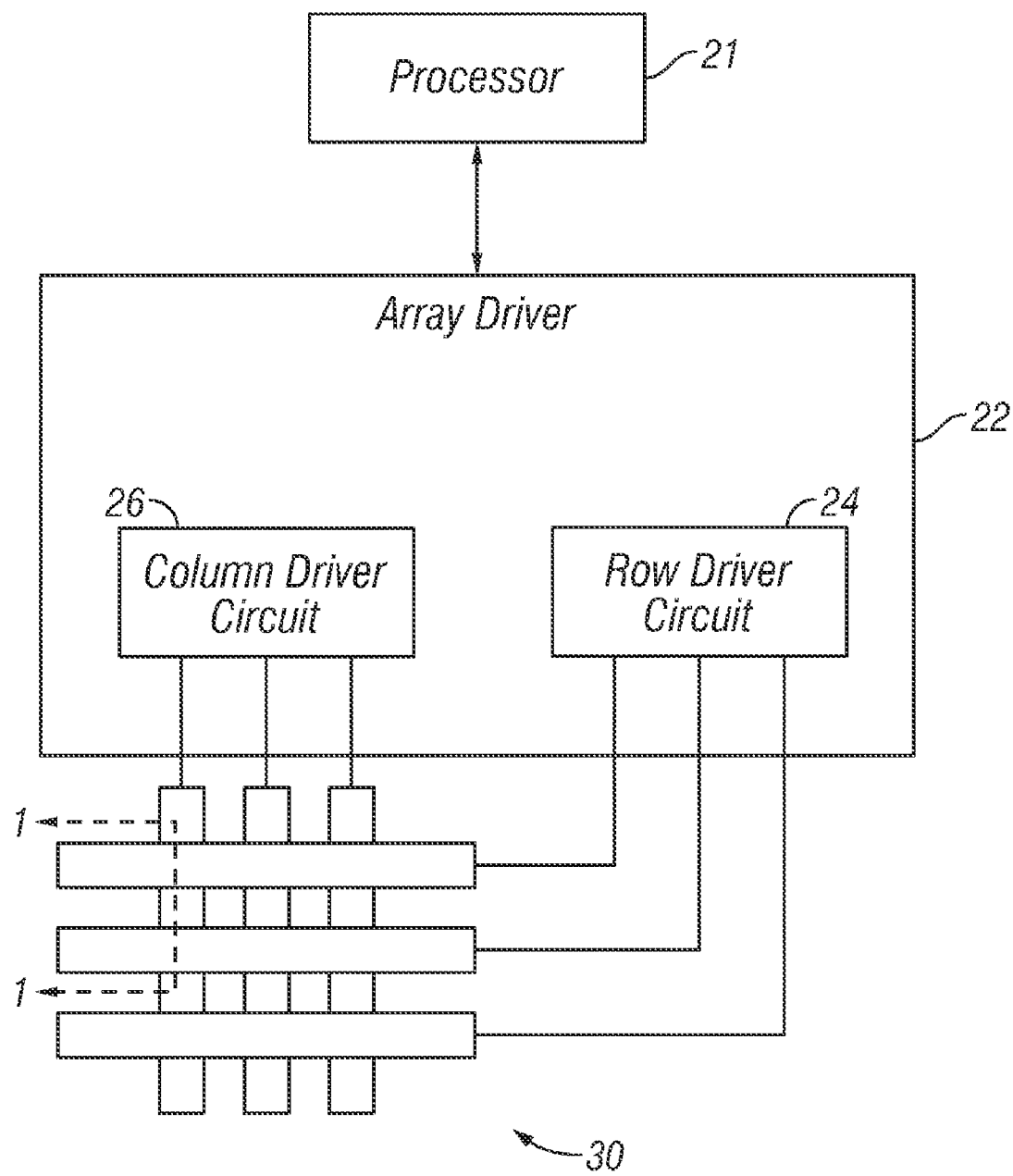
FIG. 2 is a system block diagram illustrating one embodiment of an electronic device incorporating a 3×3 interferometric modulator display.

FIG. 2 is a system block diagram illustrating one embodiment of an electronic device that may incorporate aspects described herein. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. The processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 may include a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, can be considered a capacitor formed by the fixed and moving reflective layers, this stable state can be held at a voltage within the hysteresis window with almost no power dissipation. Substantially no current flows into the pixel if the applied potential is fixed.

In some applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames may be used.

Figures 3, 4:
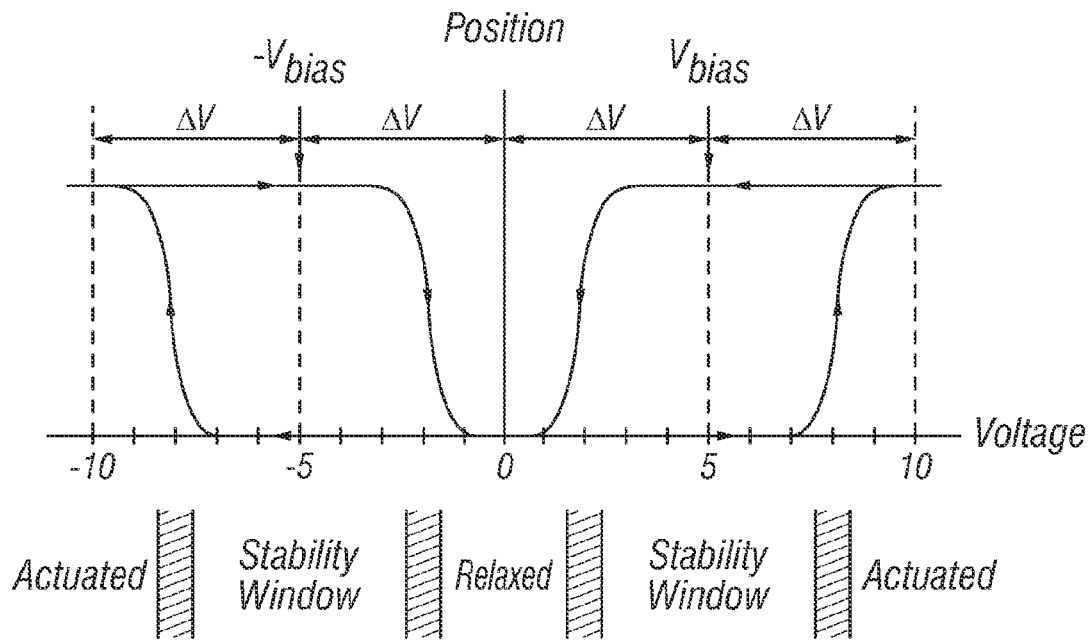
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
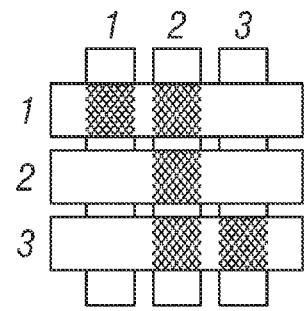
FIG. 5A illustrates one exemplary frame of display data in the 3×3 interferometric modulator display of FIG. 2.
Figure 5B:
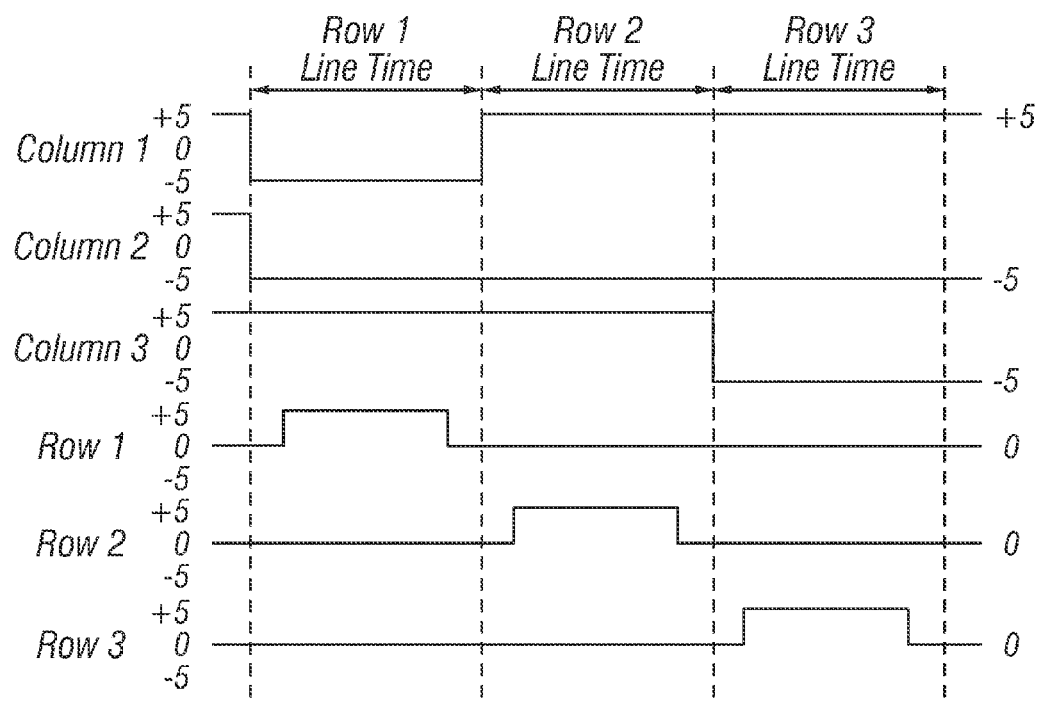
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to +ΔV, which may correspond to −5 volts and +5 volts, respectively. Relaxing the pixel is accomplished by setting the appropriate column to +$V_{bias}$, and the appropriate row to the same +ΔV, producing a zero volt potential difference across the pixel. In those rows where the row voltage is held at zero volts, the pixels are stable in whatever state they were originally in, regardless of whether the column is at +$V_{bias}$, or −$V_{bias}$. As is also illustrated in FIG. 4, voltages of opposite polarity than those described above can be used, e.g., actuating a pixel can involve setting the appropriate column to +$V_{bias}$, and the appropriate row to −ΔV. In this embodiment, releasing the pixel may be accomplished by setting the appropriate column to −$V_{bia}$, and the appropriate row to the same −ΔV, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
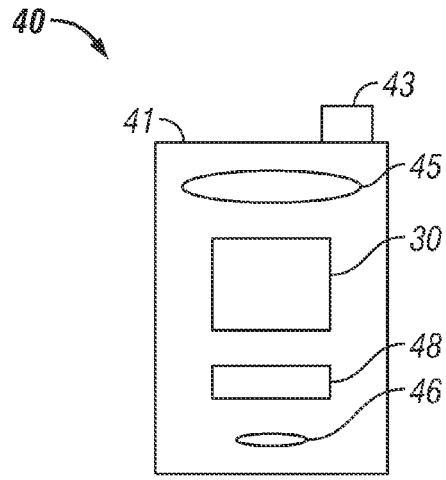
FIGS. 6A and 6B are system block diagrams illustrating an embodiment of a visual display device comprising a plurality of interferometric modulators.
Figure 6B:
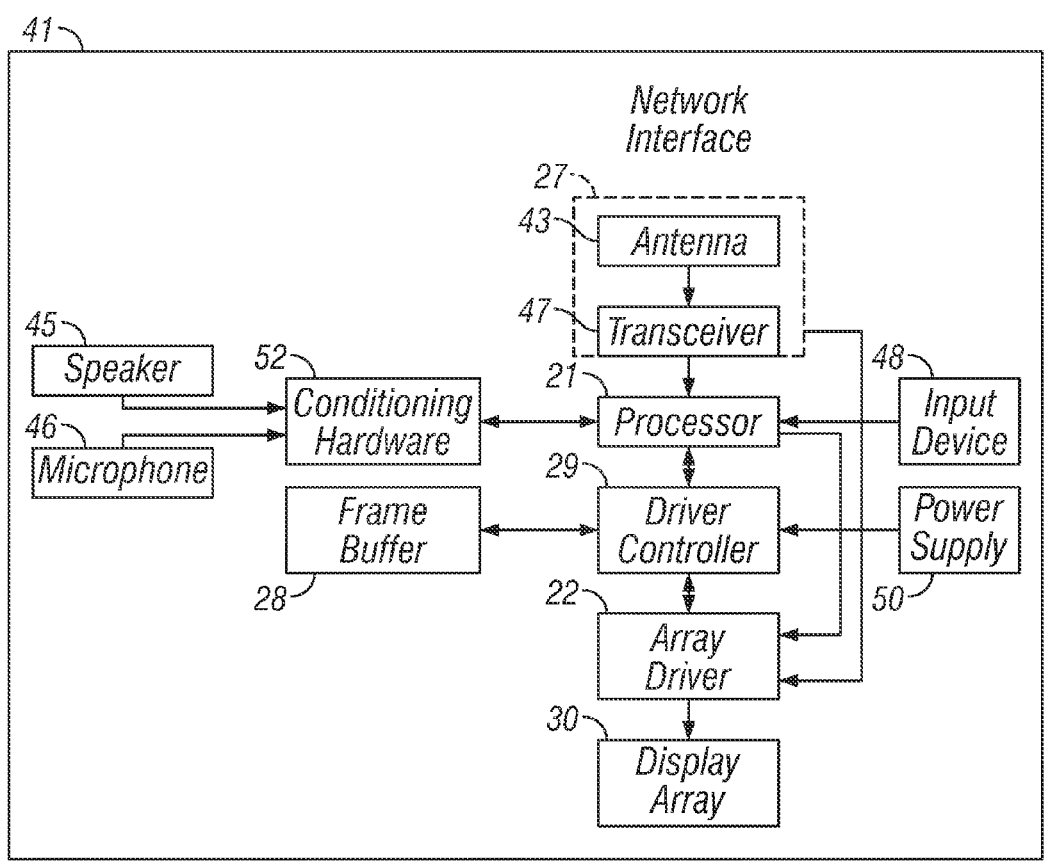

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding and vacuum forming. In addition, the housing 41 may be made from any of a variety of materials, including, but not limited to, plastic, metal, glass, rubber, and ceramic, or a combination thereof. In one embodiment, the housing 41 may include removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 may include a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 may include a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna for transmitting and receiving signals. In one embodiment, the antenna may transmit and receive RF signals according to the IEEE 802.11 standard, including IEEE 802.11(a), (b), or (g). In another embodiment, the antenna may alternatively or in addition transmit and receive RF signals according to the BLUETOOTH standard. In the case of a cellular telephone, the antenna is designed to receive CDMA, GSM, AMPS, or other signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data may refer to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46.

Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

The array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 may be a display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment may be used in highly integrated systems such as cellular phones, watches, and other small area displays. In yet another embodiment, display array 30 is a display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices. For example, in one embodiment, power supply 50 may be a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. The above-described optimizations may be implemented in any number of hardware and/or software components and in various configurations.

Figure 7A:
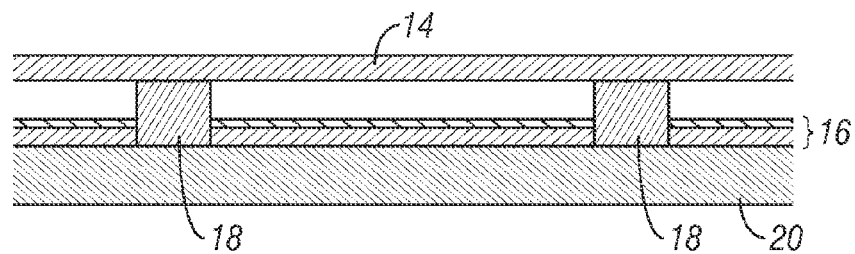
FIG. 7A is a cross section of the device of FIG. 1.
Figure 7B:
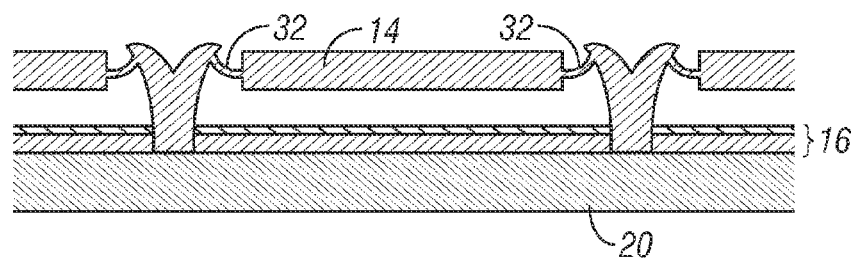
FIG. 7B is a cross section of an alternative embodiment of an interferometric modulator.
Figure 7C:
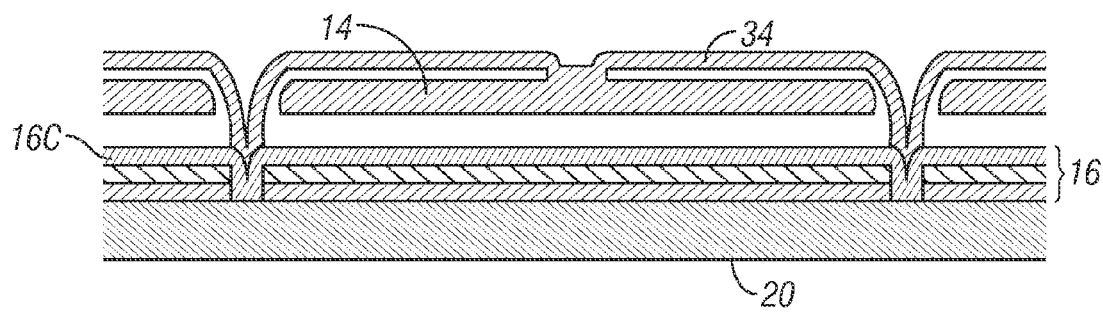
FIG. 7C is a cross section of another alternative embodiment of an interferometric modulator.
Figure 7D:
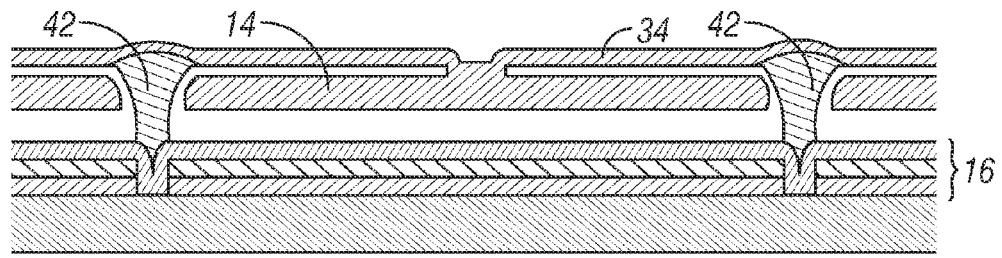
FIG. 7D is a cross section of yet another alternative embodiment of an interferometric modulator.
Figure 7E:
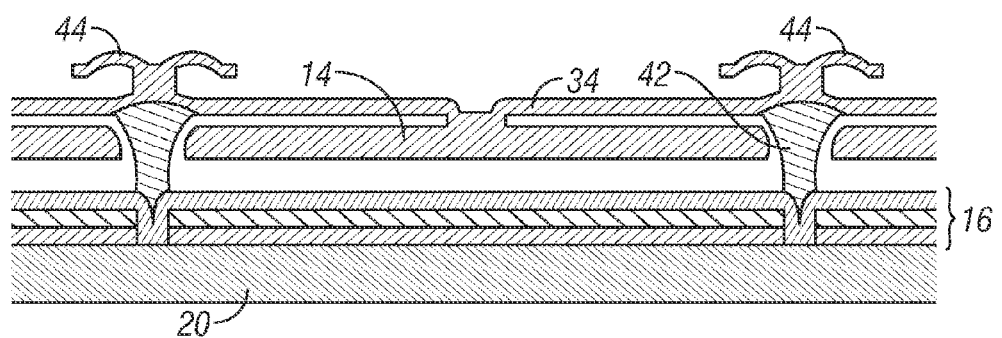
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIGS. 7A-7E, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In embodiments such as those shown in FIGS. 1 and 7A-7E, the interferometric modulator display elements can be actuated between a bright state and a dark state by selectively adjusting the distance between the movable reflective layer 14 and the optical stack 16. Incident light that reflects from the movable reflective layer 14 and the optical stack 16 interferes constructively or destructively depending on the relative positions of the movable reflective layer 14 and the optical stack 16, producing either an overall reflective (bright) or non-reflective (dark) state for the interferometric modulator. A fraction of the incident light may be absorbed by portions of the interferometric modulator and may be dissipated as heat.

In certain embodiments, the interferometric modulator display element may be configured with a photovoltaic cell that is capable of converting at least a portion of the absorbed light energy into electrical energy. A potential advantage of such embodiments is that some of the absorbed light may provide usable electrical energy rather than being dissipated as heat. For example, in certain such embodiments, substantially more incident light energy is absorbed by the optical stack 16 when the interferometric modulator is in the dark state than when the interferometric modulator is in the bright state. Accordingly, in such embodiments the optical stack 16 may be configured with a photovoltaic cell in order to generate electrical energy during operation of the interferometric modulator. The electrical energy can be used to provide electrical power to a suitable electrical load (e.g., to at least partially recharge the power supply 50 shown in FIG. 6B).

Figure 8A:
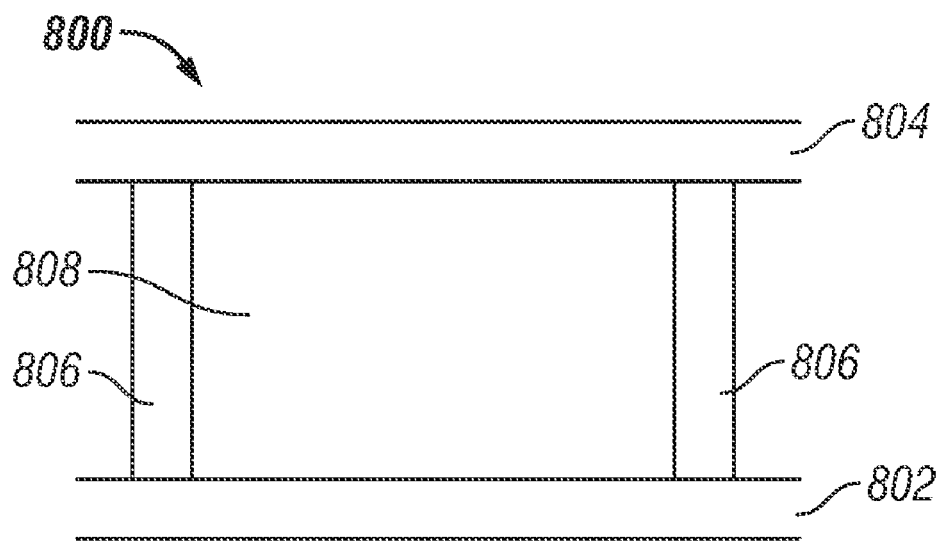
FIGS. 8A and 8B are cross sections of an embodiment of a display element comprising one or more layers configured to convert a portion of absorbed light into electric energy.
Figure 8B:
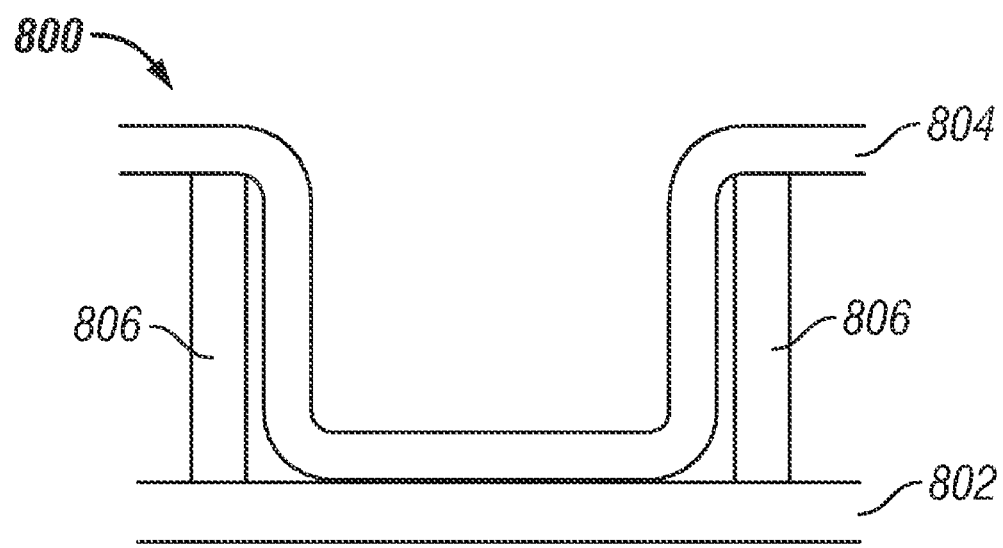

FIGS. 8A and 8B schematically illustrate an embodiment of a display element 800 configured to generate electrical energy from incident light. The display element 800 comprises a first layer 802 and a second layer 804. The second layer 804 is supported over the first layer 802 by posts 806. For example, the spacing between the posts 806 may be on the order of tens or hundreds of micrometers, and the height of the posts 806 (and thus spacing between the first layer 802 and second layer 804 in the relaxed state) may be on the order of a micrometer or less. The first layer 802 is at least partially absorptive of light, and the second layer 804 is at least partially reflective of light. In FIGS. 8A and 8B, incident light and a user would be below the display element 800. The second layer 804 is selectably movable between a first position in which the display element 800 has a first reflectivity and a second position in which the display element 800 has a second reflectivity. FIGS. 8A and 8B schematically illustrate the second layer 804 in the first position and in the second position, respectively. In the illustrated embodiment, a gap 808 is defined between the first layer 802 and the second layer 804 when the second layer 804 is in the first position. In this embodiment of the display element 800, the first reflectivity is greater than the second reflectivity, and the first position (FIG. 8A) may correspond to the bright state and the second position (FIG. 8B) may correspond to the dark state. As described above, a display device may comprise a display array (e.g., the display array 30 shown in FIG. 6B) that includes a row and/or column array of the display elements 800.

The second layer 804 can be selectably moved between the first position and the second position by applying a suitable potential difference between the first layer 802 and the second layer 804. For example, the first layer 802 may include a first electrode (e.g., a layer of ITO), and the second layer 804 may include a second electrode (e.g., an electrically conductive layer of a reflective metal such as aluminum). A voltage difference applied between the first and the second electrodes can be used to drive the display element 800 between the first and the second positions.

In certain embodiments, the first layer 802 and/or the second layer 804 can be formed of one or more layers of materials, and each of the layers can be formed of a single material or a combination of materials. For example, the first layer 802 can be formed from a variety of materials that are partially absorptive such as various metals, semiconductors (doped and/or undoped), and dielectrics. The second layer 804 can be formed from a variety of materials that are partially reflective such as, for example, metals (e.g., aluminum, silver, and/or gold). In some embodiments, the display element 800 is formed on a layer of material that is substantially transmissive of light (e.g., glass). For example, in some embodiments, the display element 800 is formed on the substrate 20 shown in FIG. 1.

The first layer 802 can be configured to convert a portion of absorbed light into electric energy, at least when the second layer 804 is in the second position. For example, in certain embodiments, the first layer 802 absorbs substantially more light when the display element 800 is in the dark state (and the second layer 804 is in the second position) than when the display element 800 is in the bright state (and the second layer 804 is in the first position). Therefore, in certain such embodiments, for a given incident light flux, the first layer 802 generates a greater electric power when the second layer 804 is in the second position than when the second layer 804 is in the first position. The amount of electric energy generated when the second layer 804 is in the first or the second position may depend on the length of time the second layer 804 is in these positions.

In certain embodiments of the display element 800, the first layer 802 and/or the second layer 804 comprise a photovoltaic element such as, for example, a thin film photovoltaic cell. The photovoltaic cell is configured to absorb light and, in response, to generate charge carriers (e.g., electrons and holes). The photovoltaic cell may include one or more electrically conductive layers (e.g., ITO layers) that can transport the charge carriers as an electric current. In some embodiments, to generate the charge carriers, the photovoltaic cell may comprise one or more layers of doped and/or undoped semiconductor materials such as amorphous, crystalline, and/or polycrystalline silicon, cadmium telluride, cadmium sulfide, copper indium selenide (CIS), copper indium gallium selenide (CIGS), gallium arsenide, germanium (and alloys thereof), organic semiconductors, and similar such materials. The band gap of the semiconductor materials advantageously may be selected to be less than the photon energy of the incident light so that charge carriers are efficiently generated by light absorbed by the first layer 802. The semiconductor layers may be formed into one or more semiconductor junctions including a p-n junction, a p-i-n junction, etc. In some embodiments, additional layers may be included such as, for example, one or more metal layers to provide a metal-semiconductor Schottky junction. Further aspects of a photovoltaic element comprising a thin film photovoltaic cell will be described further below (see FIGS. 10A-10C).

Figure 9A:
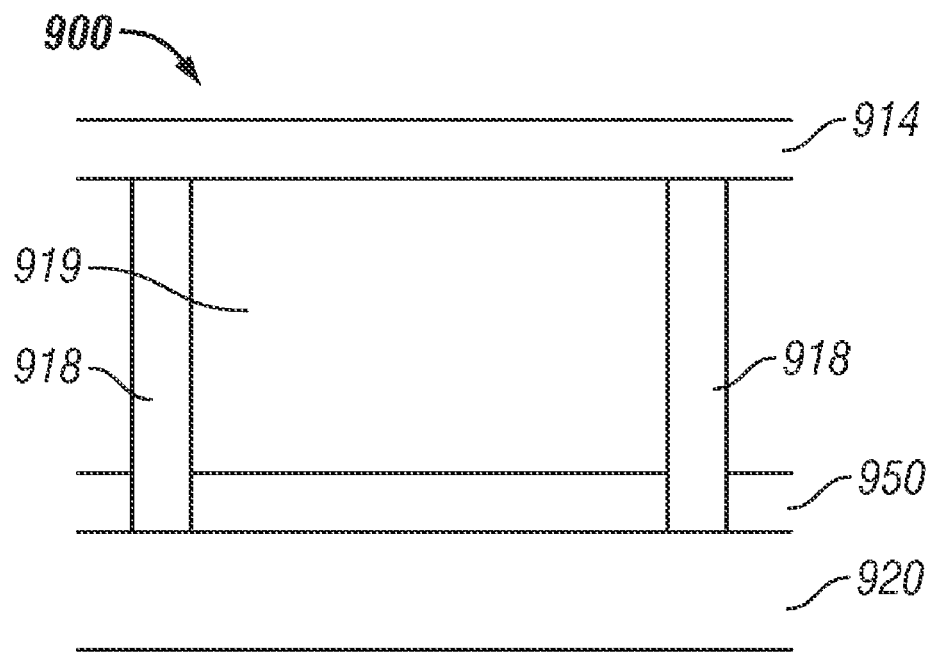
FIGS. 9A and 9B are cross sections of an embodiment of a MEMS display element comprising a photovoltaic structure configured to generate electrical energy from absorbed light.
Figure 9B:
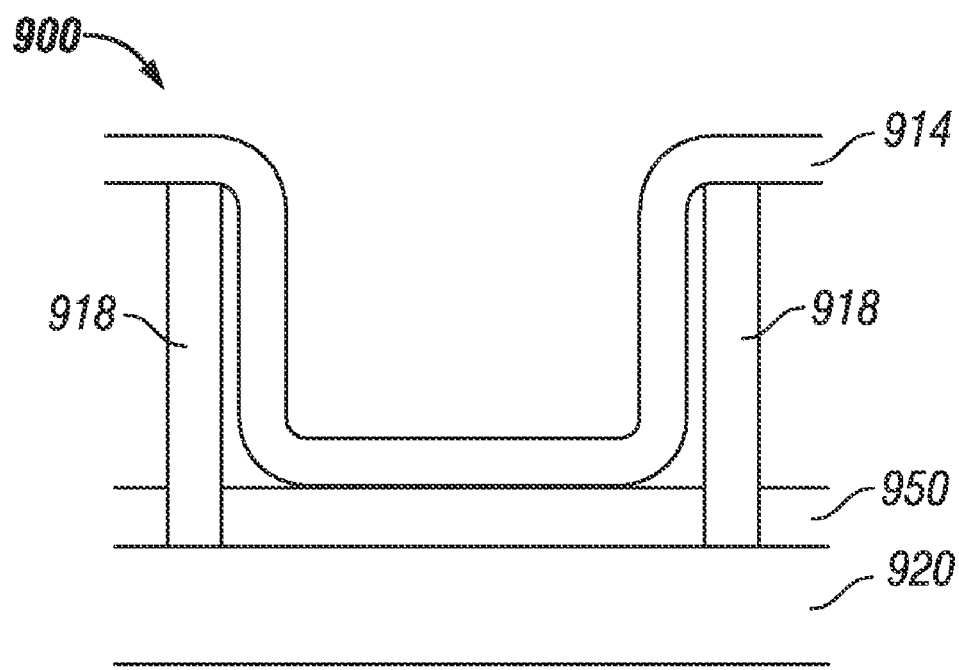

FIGS. 9A and 9B schematically illustrate an embodiment of a microelectromechanical systems (MEMS) display element 900 configured to generate electric energy from light incident on the display element 900. The display element 900 comprises a substrate 920 that is at least partially transmissive to light having one or more wavelengths in a range of wavelengths. The range of wavelengths may include portions of the visible spectrum. The display element 900 also comprises a movable element 914 over the substrate 920, and a photovoltaic structure 950 between the substrate 920 and the movable element 914. A mechanical support structure, including, for example, posts 918, can be used to support the movable element 914. In the embodiment shown in FIGS. 9A and 9B, the posts 918 may extend at least partially through the photovoltaic structure 950. For example, the posts 918 may extend to the substrate 920 as shown in the embodiment of the display element 900 schematically illustrated in FIGS. 9A and 9B. In other embodiments, the posts 918 may be formed on an upper surface of the photovoltaic structure 950 (see, e.g., FIGS. 8A and 8B).

The movable element 914 is at least partially reflective of light transmitted through the substrate 920. The movable element 914 is a first distance from the substrate 920 when the display element 900 is in a first state and a second distance from the substrate 920 when the display element 900 is in a second state. The first distance is different from the second distance. FIGS. 9A and 9B schematically illustrate the embodiment of the display element 900 in the first state and the second state, respectively. In certain embodiments, the first state corresponds to the bright state, and the second state corresponds to the dark state of the display element 900. As described above, a display device may comprise a display array (e.g., the display array 30 shown in FIG. 6B) that includes a row and/or column array of the display elements 900.

The photovoltaic structure 950 is configured to absorb at least a portion of the light transmitted through the substrate 920 and, in response, to generate electric energy. The generated electric energy may include an electric voltage and/or an electric current. The display element 900 may include one or more electrically conductive elements configured to electrically transport the generated electric energy from the photovoltaic structure 950 to a suitable electrical load. In certain embodiments, the electrically conductive elements comprise one or more layers of an electrically conductive material such as a metal (e.g., indium tin oxide). The generated electric energy may be used to provide power to the display element 900 or other components. In certain embodiments, the generated electric energy is conducted to an energy storage device such as, for example, a rechargeable battery, a capacitor, etc. The energy storage device may be used to supply energy for driving the display element 900 between the first state and the second state.

As shown in FIG. 9A, the photovoltaic structure 950 and the movable element 914 are separated by a gap 919 when the display element 900 is in the first state. The gap 919 may contain a fluid such as air. In some embodiments, the gap 919 may be depressurized to provide a partial vacuum. As described above, by applying a suitable electric potential to the display element 900, the movable element 914 may move from the first position (e.g., FIG. 9A) to the second position (e.g., FIG. 9B).

In certain embodiments, the display element 900 may be configured so that when in the first state (e.g., FIG. 9A) the display element 900 has a first reflectivity, and when in the second state (e.g., FIG. 9B), the display element 900 has a second reflectivity. The first reflectivity may be greater than the second reflectivity, and in such embodiments, the first state may correspond to the bright state of the display element 900, and the second state may correspond to the dark state of the display element 900. In certain embodiments, more incident light energy is absorbed in the photovoltaic structure 950 when the display element 900 is in the second state (e.g., the dark state) than when the display element 900 is in the first state (e.g., the bright state). In such embodiments, the photovoltaic structure 950 generates a first electric energy in the first state that is less than a second electric energy generated in the second state.

Figure 10A:
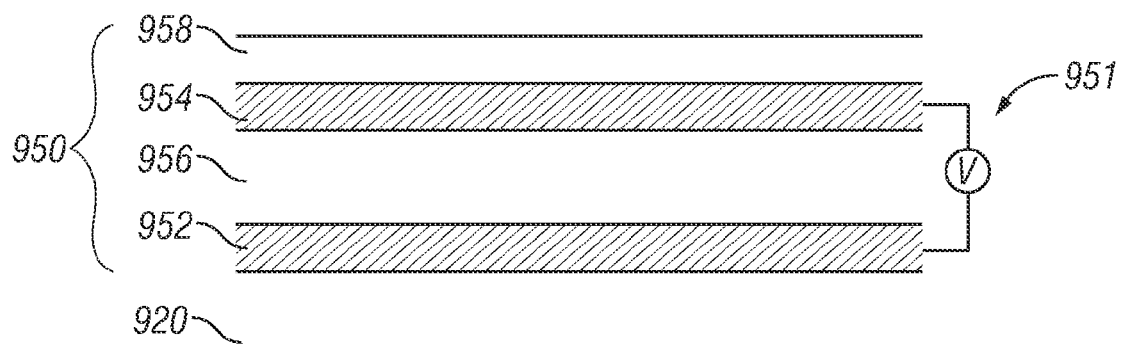
FIG. 10A is a cross section of an embodiment of the photovoltaic structure of the MEMS display element shown in FIGS. 9A and 9B.

FIG. 10A is a close-up cross section view that schematically illustrates a portion of the photovoltaic structure 950 in the embodiment of the display element 900 shown in FIGS. 9A and 9B. In this embodiment, the photovoltaic structure 950 is formed on the substrate 920. The photovoltaic structure 950 comprises a first electrode layer 952, a second electrode layer 954, a photovoltaic cell 956, and an electrically nonconductive layer 958. The photovoltaic cell 956 is configured to generate electric energy from light that is absorbed in the photovoltaic cell 956. The first and the second electrode layers 952, 954 are electrically coupled to the photovoltaic cell 956 and configured to transport the generated electric energy to an external electric circuit 951. The electric circuit 951 may comprise one or more electric loads. For example, in some embodiments, the electric load may comprise an electric energy storage device (e.g., a battery and/or a capacitor) used to store a portion of the generated electric energy. In certain embodiments, at least some of the electric energy generated by the photovoltaic cell 956 is used to supply energy for driving the display element 900 between the first state and the second state.

The first and/or the second electrode layers 952, 954 may comprise an electrically conductive material such as a metal or conductive oxide, for example, indium tin oxide (ITO) or zinc oxide (ZnO). Although FIG. 10A illustrates an embodiment comprising two electrode layers 952 and 954, in other embodiments a single electrode layer may be used. The movable layer 914 may also be formed from an electrically conductive material such as a metal. In some embodiments, the movable layer 914 comprises aluminum. As described above, the display element 900 may be actuated between the first state (e.g., FIG. 9A) and the second state (e.g., FIG. 9B) by applying a suitable electric potential across the gap 919. In some embodiments, the potential is applied between the movable layer 914 and one, or both, of the electrode layers 952, 954. The electrically nonconductive layer 958 may be formed from a dielectric material and advantageously prevents electrical shorting between the movable layer 914 and the electrode 954 when the display element 900 is in the second state. In some embodiments, the thickness of the electrically nonconductive layer 958 is chosen to provide a desired separation between the movable layer 914 and the photovoltaic structure 950. The electrically nonconductive layer 958 in some embodiments may be formed from a layer of aluminum oxide approximately 5 nm thick. The electrically nonconductive layer 958 may comprise additional or alternative electrical passivation layers such as, for example, a thin layer of silicon oxide.

Figure 10B:
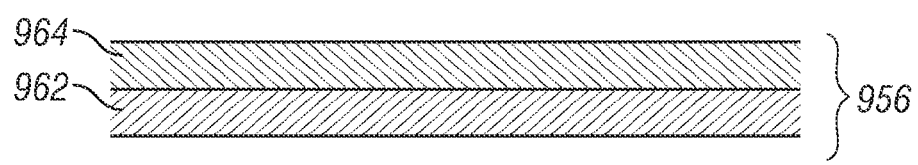
FIGS. 10B and 10C are cross sections of embodiments of a photovoltaic cell.
Figure 10C:
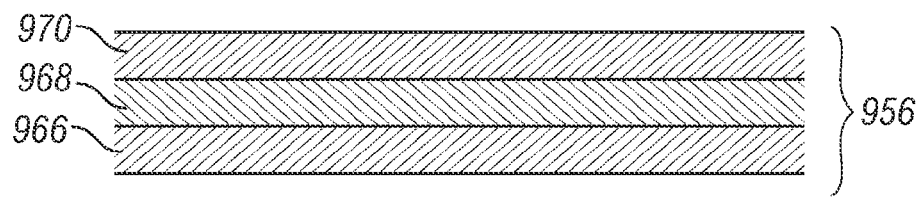

FIGS. 10B and 10C are cross sections that schematically illustrate embodiments of the photovoltaic cell 956. In certain embodiments, the photovoltaic cell 956 is formed from one or more thin film layers that are at least partially absorptive of light. FIG. 10B shows an embodiment of the photovoltaic cell 956 comprising two layers 962 and 964. The two layers 962 and 964 can be selected to form a photovoltaic junction capable of generating electric energy from absorbed light energy. In certain embodiments, the layers 962 and 964 comprise a semiconductor material such as amorphous, crystalline, and/or polycrystalline silicon, cadmium telluride, cadmium sulfide, copper indium selenide (CIS), copper indium gallium selenide (CIGS), gallium arsenide, germanium (and alloys thereof), organic semiconductors, and similar such materials. The layers 962 and 964 may be suitably doped to form a p-n junction. For example, in some embodiments, the layer 962 comprises a p-doped semiconductor and the layer 964 comprises an n-doped semiconductor. In other embodiments, the layer 962 is n-doped and the layer 964 is p-doped. In certain embodiments, the same semiconductor material is used in both layers 962, 964 (e.g., a p-n homojunction), and in other embodiments different semiconductor materials are used in the layers 962, 964 (e.g., a p-n heterojunction). In other embodiments, one of the layers 962, 964 comprises a metal, and the photovoltaic junction comprises a metal-semiconductor Schottky junction. In certain embodiments, the layer 962 and/or the layer 964 may have a thickness of about 35 nm. The thicknesses of the layers 962 and 964 may be approximately the same as each other in some embodiments. In other embodiments, the thicknesses of the layers 962 and 964 may be different from each other. Many variations are possible.

FIG. 10C shows an embodiment of the photovoltaic cell 956 comprising three layers: a middle layer 968 between two outer layers 966 and 970. In this embodiment, the photovoltaic cell 956 comprises a p-i-n junction formed from a p-doped semiconductor, an intrinsic (undoped) semiconductor, and an n-doped semiconductor. The middle layer 968 is formed from the intrinsic semiconductor. One of the outer layers (e.g., the layer 966) is formed from the p-doped semiconductor, while the other outer layer (e.g., the layer 970) is formed from the n-doped semiconductor. The material used in the layers 966-970 may comprise any suitable semiconductor such as, for example, amorphous, crystalline, and/or polycrystalline silicon, cadmium telluride, cadmium sulfide, copper indium selenide (CIS), copper indium gallium selenide (CIGS), gallium arsenide, germanium (and alloys thereof), organic semiconductors, and similar such materials. In certain embodiments, the layer 966 and/or the layer 970 may have a thickness of about 10 nm. The thicknesses of the layers 966 and 970 may be approximately the same in some embodiments. In other embodiments, the thicknesses of the layers 966 and 970 may be different from each other. In certain embodiments, the layer 968 has a thickness of about 50 nm. In other embodiments, the thickness of the layer 968 may have a different value (e.g., about 200 nm). Many variations are possible.

In various embodiments, the photovoltaic structure 950 may comprise additional and/or different layers than those illustrated in FIG. 10A. For example, antireflection coatings may be applied to the electrically nonconductive layer 958 and/or the substrate 920 to improve the transmission of light energy to the photovoltaic cell 956. Also, the photovoltaic cell 956 may be configured differently than shown in FIGS. 10B and 10C, for example, with additional and/or different layers. In some embodiments, the photovoltaic cell 956 comprises a multi-junction device utilizing a plurality of layered or stacked photojunctions to improve the efficiency of the photoelectric energy generation. For example, the photovoltaic cell 956 may comprise two, three, four, five, or more photojunctions, and the photojunctions may include p-n junctions, p-i-n junctions, Schottky junctions, etc.

Any of the embodiments of an interferometric modulator shown in FIGS. 7A-7E may be configured with a layer that is capable of converting at least a portion of absorbed light energy into electrical energy. For example, in certain embodiments, the optical stack 16 shown in FIGS. 7A-7E may be replaced by the photovoltaic structure 950 shown in FIG. 10A. In other embodiments, the optical stack 16 includes a photovoltaic cell such as shown in FIGS. 10B and 10C.

In some embodiments, the display element 900 has a first reflectivity in the first state (e.g., FIG. 9A) and a second reflectivity in the second state (e.g., FIG. 9B). Desired values of the first and second reflectivities (and/or other display characteristics) may be provided by configuring various aspects of the display element 900 including, for example, the reflectivity of the movable element 914, the height of the gap 919 in the relaxed and actuated states, optical characteristics of the photovoltaic structure 950, and so forth. The optical characteristics of the photovoltaic structure 950 may include transmissivity, absorptivity, and/or reflectivity of light. For example, in certain embodiments the transmissivity of the photovoltaic structure 950 is such that the second reflectivity is less than about 10 percent of the first reflectivity. In other embodiments, the transmissivity of the photovoltaic structure 950 may be such that the second reflectivity is less than about 30 percent of the first reflectivity, less than about 20 percent of the first reflectivity, less than about 15 percent of the first reflectivity, less than about 5 percent of the first reflectivity, or some other value.

In certain embodiments such as shown in FIG. 10A, the photovoltaic structure 950 comprises a number of layers, including the photovoltaic cell 956, which also may comprise a number of layers. The optical properties of the photovoltaic structure 950 will depend on the optical properties of the various layers, including the optical properties of the photovoltaic cell 956. As described above, embodiments of the photovoltaic cell 956 may comprise layers of doped as well as intrinsic (undoped) semiconductor. For many semiconductor materials, the optical properties of intrinsic and doped semiconductor are approximately the same. Therefore, in certain embodiments the optical properties of the photovoltaic cell 956 can be approximated as the optical properties of a single layer of intrinsic semiconductor having a thickness equal to the sum of the thicknesses of all the layers in the photovoltaic cell 956. For example, the photovoltaic cell 956 may have three layers that form a p-i-n junction as shown in FIG. 10C. In one example embodiment, the outer layers 966 and 970 are doped amorphous silicon each having a thickness of about 50 nm, and the middle layer 968 is intrinsic amorphous silicon having a thickness of about 200 nm. The optical properties of this example embodiment are approximately the same as a single layer of amorphous silicon that is about 300 nm thick.

In certain embodiments, the properties of the photovoltaic structure 950 are selected so that the energy generation efficiency of the photovoltaic cell 956 is reasonably large. In certain such embodiments, the number of layers and/or the respective thicknesses of the layers can be selected to provide the desired photovoltaic characteristics of the photovoltaic structure 950. For example, in some embodiments, the photovoltaic cell 956 comprises amorphous silicon. The total thickness of the amorphous silicon can be chosen so that the display element 900 has desired optical properties (e.g., reflectivities in the bright and dark states). For this particular value of the total thickness, the number of layers (and/or their individual thicknesses) in the photovoltaic cell 956 can be chosen to increase or optimize the photovoltaic efficiency of the cell 956. For example, in certain embodiments the total thickness of the photovoltaic cell 956 is about 70 nm. In certain such embodiments, the photovoltaic cell 956 comprises two layers (e.g., the layers 962, 964 shown in FIG. 10B), and the layers may each have a thickness of about 35 nm. In other embodiments, the photovoltaic cell 956 comprises three layers (e.g., the layers 966, 968, and 970 shown in FIG. 10C). In some of these embodiments, the layers 966 and 970 have thicknesses of about 10 nm, and the layer 968 has a thickness of about 50 nm. Other thicknesses and numbers of layers may be used in other embodiments.

Figure 11A:
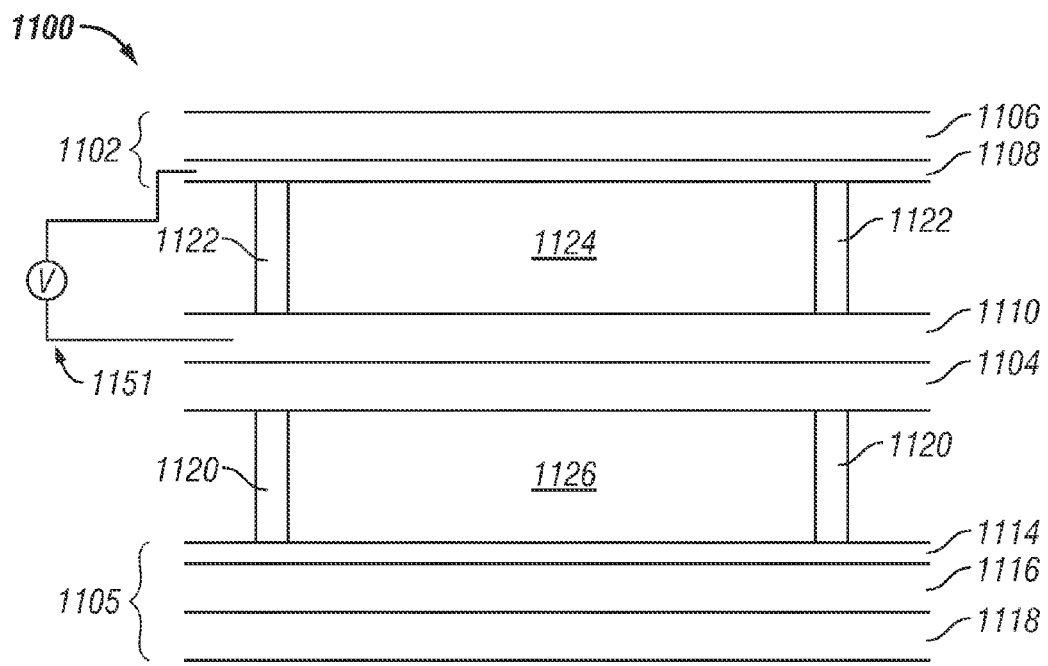
FIGS. 11A-11C are cross sections of embodiments of a display element comprising a photovoltaic element.
Figure 11B:
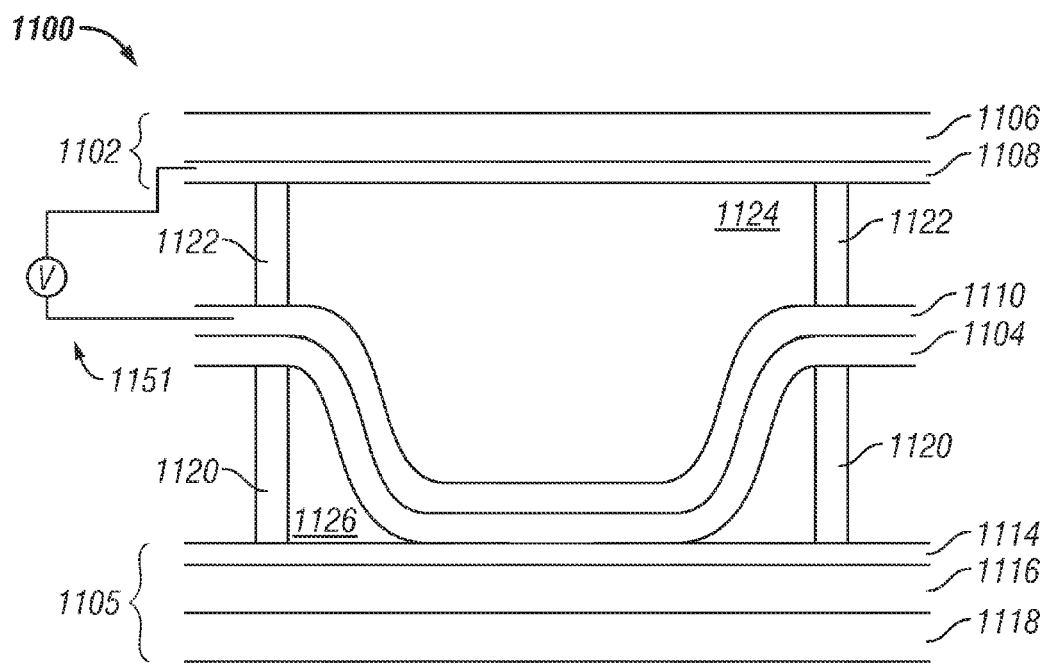

FIGS. 11A and 11B are cross sections schematically illustrating another embodiment of a display element 1100. The display element 1100 is an example of an inverse-type interferometric modulator with a configuration that substantially decouples the electromechanical behavior from the interferometric optical behavior. For example, in FIGS. 11A and 11B, a viewer would observe the display element 1100 from above. The display element 1100 comprises a first layer 1102 that is at least partially transmissive of light and a second layer 1104 that is at least partially reflective of light. The second layer 1104 is spaced from the first layer 1102, and a first cavity 1124 is formed therebetween. The second layer 1104 is spaced from a third layer 1105, and a second cavity 1126 is formed therebetween. In certain embodiments, when the display element 1100 is in the relaxed state shown in FIG. 11A, the height of the first cavity 1124 is much less than the height of the second cavity 1126. In the actuated state shown in FIG. 11B, the second layer moves downward into the second cavity 1126 due to electrostatic attraction between the second layer 1104 and the third layer 1105.

The first layer 1102 is supported by first support posts 1122, and the second layer 1104 is supported by second support posts 1120. The second layer 1104 is selectably movable between a first position in which the display element 1100 has a first reflectivity and a second position in which the display element 1100 has a second reflectivity. For example, the display element 1100 may be configured in the relaxed state shown in FIG. 11A so that light incident on the element 1100 forms a standing wave in the second cavity 1126 that causes increased absorption of light in the first layer 1102 and/or the second layer 1104. In such embodiments, FIG. 11A shows the display element 1100 in the second position, which corresponds to the dark state. In the actuated state shown in FIG. 11B, the second layer 1104 is closer to the third layer 1105 (e.g., due to electrostatic attraction), the standing wave is modified, and the display element 1100 reflects substantially more light than in the relaxed state. In such embodiments, FIG. 11B shows the display element 1100 in the first position corresponding to the bright state, in which the first reflectivity is greater than the second reflectivity.

In some embodiments, the first layer 1102 comprises a substantially transmissive layer 1106 (e.g., glass) and an optical layer 1108, which may be formed from a partially reflective material such as ITO (formed as a punctured sheet in some implementations). The second layer 1104 may be partially or fully reflective and may be formed from a metal such as aluminum. The third layer 1105 may comprise one or more layers. For example, in the embodiment shown in FIGS. 11A and 11B, the third layer 1105 comprises an electrically nonconductive layer 1114 (e.g., a dielectric layer), an electrode layer 1116, and a substrate 1118. The substrate 1118 may be substantially nontransparent to light (e.g., opaque). The electrode layer 1116 can be electrically connected to a driving mechanism and used for electrostatic actuation of the display element 1100, for example by applying a voltage between the electrode 1116 and the second reflective layer 1104. In some embodiments, the electrode 1116 forms a column electrode and is driven by the column driver circuit 26, and the second reflective layer 1104 forms a row electrode and is driven by the row driver circuit 24 as described above with reference to FIGS. 2-4. The electrically nonconductive layer 1114 advantageously prevents electrical shorting between the second layer 1104 and the electrode layer 1116 when the second layer 1104 is in the actuated position (FIG. 11B).

The display element 1100 also comprises a photovoltaic element 1110. The photovoltaic element 1110 may be formed on the first layer 1102 or the second layer 1104. The photovoltaic element 1110 may be formed between the first layer 1102 and the second layer 1104. FIGS. 11A and 11B schematically illustrate an embodiment in which the photovoltaic element 1110 is formed on the second layer 1104. The photovoltaic element 1110 is at least partially absorptive of light and is configured to convert a portion of the absorbed light into electric energy, at least when the second layer 1104 is in the second position. The photovoltaic element 1110 may include one or more photovoltaic cells such as the photovoltaic cells 956 shown in FIGS. 10A-10C. For example, the photovoltaic element 1110 may include a thin-film semiconductor junction such as a p-n junction, a p-i-n junction, and/or a metal-semiconductor Schottky junction. The photovoltaic element 1110 may comprise amorphous, crystalline, and/or polycrystalline silicon, cadmium telluride, cadmium sulfide, copper indium selenide (CIS), copper indium gallium selenide (CIGS), gallium arsenide, germanium (and alloys thereof), organic semiconductors, and similar such materials. The photovoltaic element 1110 may also include one or more electrically conductive layers to carry the generated electricity to an electrical circuit 1151 comprising an electrical load. For example, in some embodiments an electrically conductive layer of a metal such as ITO (not shown in FIGS. 11A and 11B) is formed over the photovoltaic element 1110. The photovoltaic element 1110 may be electrically isolated from the second layer 1104 by an electrically nonconductive layer (e.g., a dielectric layer).

The first support posts 1122 and/or the second support posts 1120 may be formed from electrically nonconductive materials (e.g., dielectrics) and/or electrically conductive materials (e.g., metals). In certain embodiments, at least a portion of the first support posts 1122 is electrically conductive and electrically connected to an electrically conductive layer of the photovoltaic element 1110 to form a portion of the electrical circuit 1151. In other embodiments, the first support posts 1122 may be electrically nonconductive and one or more bus structures are used to provide signal routing.

Figure 11C:
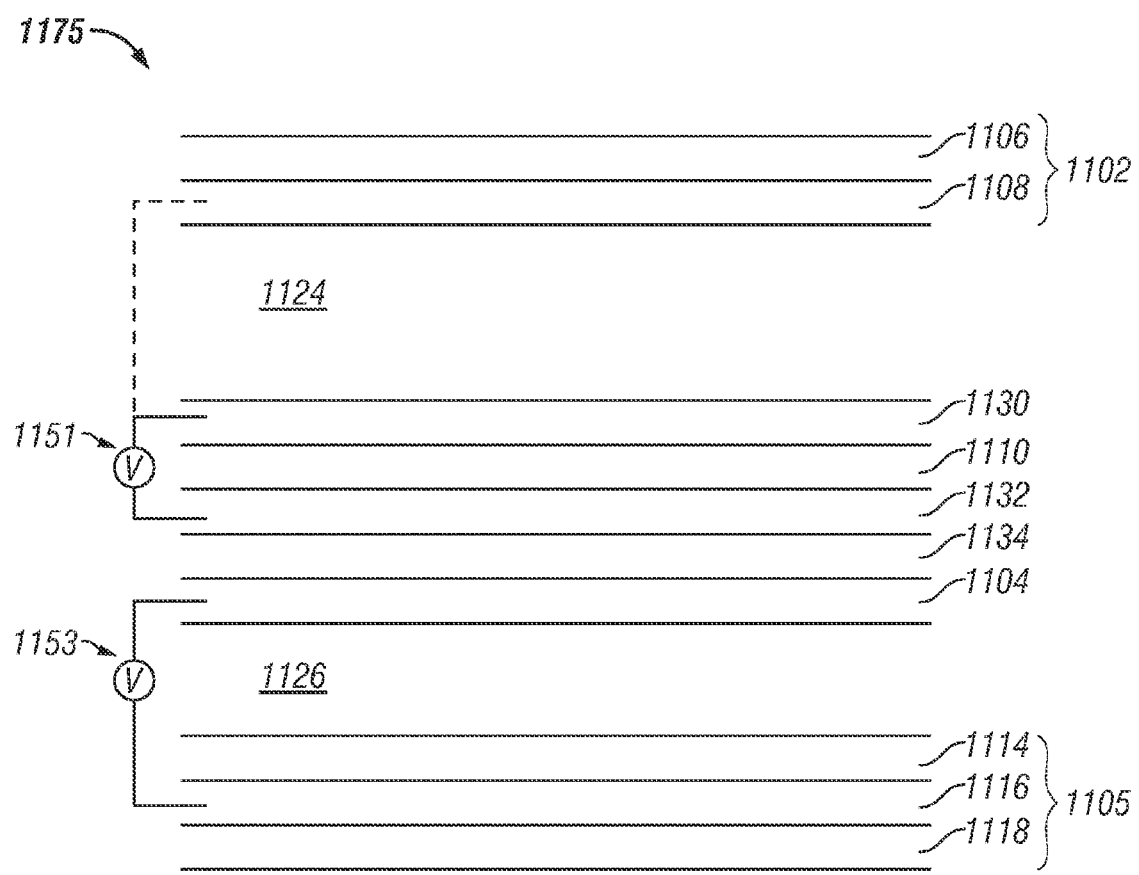

FIG. 11C is a cross-section that schematically illustrates another embodiment of a display element 1175 that is configured as an inverse-type interferometric modulator. In FIG. 11C, the support structure is not shown. Features of the display element 1175 that are generally similar to those of the display element 1100 are indicated by like reference numerals. In the embodiment shown in FIG. 11C, the photovoltaic element 1110 is formed between and electrically coupled to a first electrode layer 1130 and a second electrode layer 1132. An electrically nonconductive layer 1134 (e.g., a dielectric layer) is used to prevent electrical shorting between the second electrode 1132 and the second layer 1104. The first and the second electrode layers 1130, 1132 may be formed from a metal such as ITO. The first electrode layer 1130 may be very thin such as, for example, 20 nm or less, and advantageously may be substantially transmissive to light. The first and the second electrode layers 1130, 1132 are configured to transport electric energy generated by the photoelectric element 1110 to the external electric circuit 1151. In some embodiments, the optical layer 1108 (which may be a thin layer of ITO) is electrically connected to the first electrode layer 1130 and forms part of the electric circuit 1151 (schematically illustrated by a dashed line in FIG. 11C). In such embodiments, the first electrode layer 1130 is optional and may be replaced by a dielectric layer.

The electrode layer 1116 is electrically connected to the second layer 1104 as part of a driving circuit 1153 for the display element 1175. As described above, in some embodiments the second layer 1104 comprises row electrodes and the electrode layer 1116 comprises column electrodes for providing actuation voltages to move the second layer 1104 between the first position and the second position. In the display element 1175, the photovoltaic circuit 1151 is electrically separated from the driving circuit 1153, which advantageously may simplify electrical routing in a display comprising an array of the display elements 1175. In other embodiment, the electrically nonconductive layer 1134 is not used so that the photovoltaic circuit 1151 and the driving circuit 1153 are not electrically isolated but share a common electrical line.

FIG. 11D is a graph 1180 that shows an example calculation of the reflectivity as a function of wavelength of light (in nanometers) for an embodiment of the display element 1175 shown in FIG. 11C. The properties of the layers of the embodiment of the display element 1175 used for the example calculation are provided in Table 1. The second layer 1104 is sufficiently reflective that layers below the second layer 1104 do not substantially affect the optical properties of the display element 1175. To model the operation of the display element 1175 between the bright state and the dark state, the height of the first cavity 1124 is assumed to range from 0 nm (the dark state in which the second layer 1104 is in the second position) to 160 nm (the bright state in which the second layer 1104 is in the first position).

TABLE 1

| Layer | Material | Height (nm) |
|---|---|---|
| Substantially transmissive layer 1106 | Glass | Infinite |
| Optical layer 1108 | ITO | 60 |
| First Cavity 1124 | Air | 0 to 160 |
| First electrode 1130 | ITO | 10 |
| Photovoltaic element 1110 | Amorphous Silicon | 77 |
| Second electrode 1132 | — | 0 |
| Electrically nonconductive layer 1134 | — | 0 |
| Second layer 1104 | Aluminum | 100 |

The graph 1180 shows nine reflectivity curves 1182-1198 for nine heights of the first cavity 1124 between 0 nm and 160 nm in 20 nm increments. The curve 1182 is for a cavity height of 0 nm, when the display element 1175 is in the relaxed state. The curve 1198 is for a cavity height of 160 nm, when the display element 1175 is in the actuated state. In between the relaxed state and the actuated state, the curve 1184 is for a cavity height of 20 nm, the curve 1186 is for a cavity height of 40 nm, and so forth. The graph 1180 in FIG. 11D demonstrates that the reflectivity of the display element 1175 generally increases (at most wavelengths beyond about 450 nm) as the cavity height changes from 0 nm to 160 nm. In the actuated state, the photopic reflectivity (e.g., the reflectivity as experienced by a human eye) is about 59%. The photopic contrast ratio between the bright state and the dark state is about 7-to-1 for this example embodiment. The chrominance of the display element 1175 in the bright state has (u'-v') color values of (0.192, 0.464), which would be perceived as substantially white by the human eye.

As described with reference to FIG. 1, a display device can comprise a plurality of pixels (e.g., the pixels 12a, 12b), wherein each pixel comprises one or more display elements including, for example, the display elements 800, 900, 1100, and 1175 described above. In certain embodiments, the display device comprises a substrate that may be substantially transmissive to light (e.g., the substrate 920 in FIGS. 9A, 9B). In other embodiments, the substrate may be substantially opaque (e.g., the substrate 1118 in FIGS. 11A-11C). In some embodiments, the display elements may comprise the example interferometric modulators shown in FIGS. 7A-7E, in which the optical stack 16 includes a photovoltaic element configured to absorb at least a portion of the light transmitted through the substrate 20 and, in response, to generate electric energy. In some embodiments, the photovoltaic element may be configured similarly to the embodiment shown in FIG. 10A and may include one or more photovoltaic cells such as the example photovoltaic cells shown in FIGS. 10B and 10C.

In certain embodiments of the display device, each interferometric modulator of the plurality of interferometric modulators has a bright state and a dark state. In certain such embodiments, the photovoltaic structure generates substantially more electric energy when the interferometric modulator is in the dark state than when the interferometric modulator is in the bright state. Also, in some embodiments, the display device includes one or more electric energy storage devices configured to store at least a portion of the electric energy generated by the photovoltaic structures. In various embodiments, the plurality of interferometric modulators may be configured on the substrate to form a monochrome, black and white, grayscale, or color display device.

Figure 12:
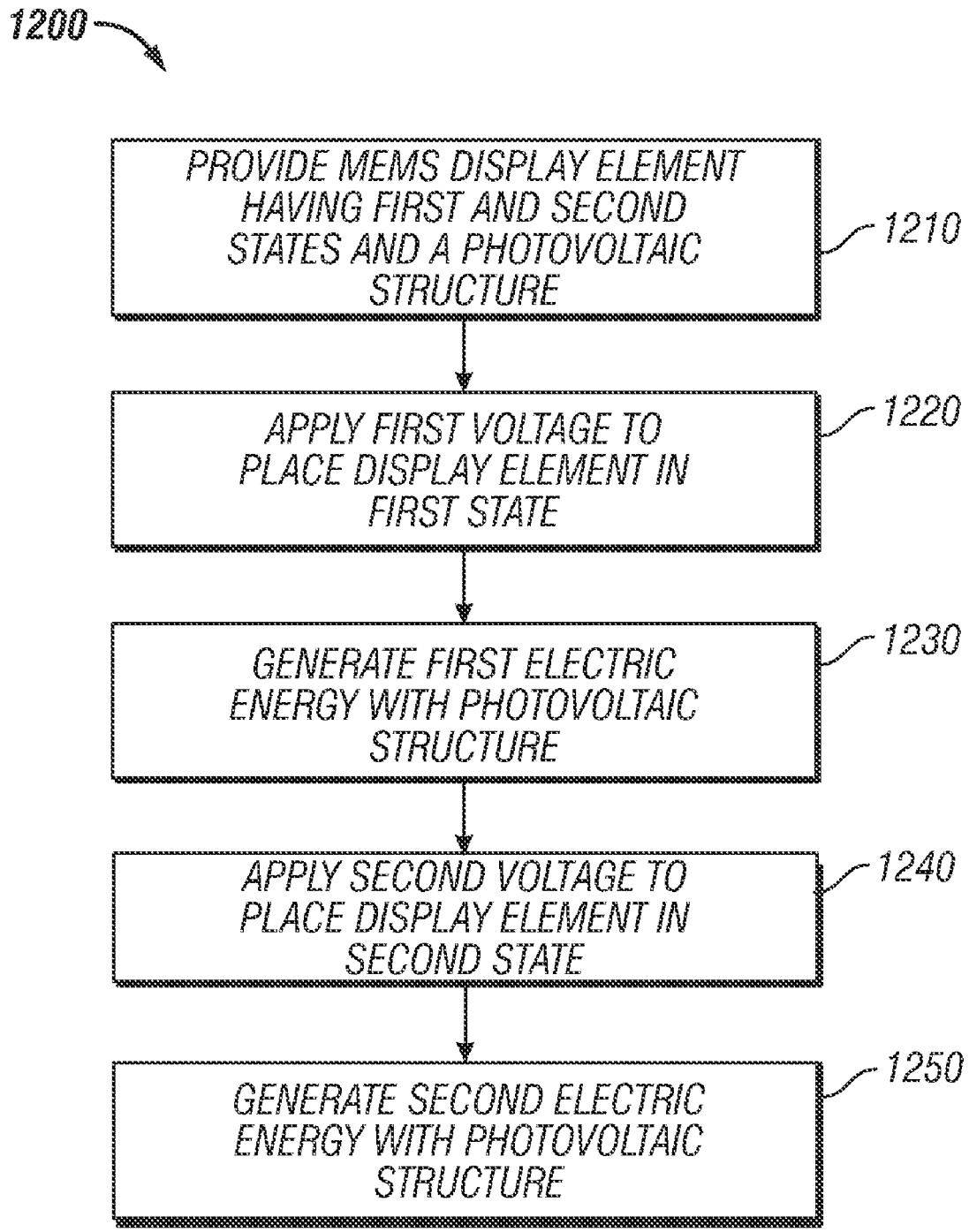
FIG. 12 is a flow diagram for an embodiment of a method of generating electric energy with a MEMS display element.

Various embodiments of the interferometric modulator devices described herein advantageously can be used to generate electric energy during their operation. An embodiment of a method 1200 of generating electric energy is illustrated in the flow diagram shown in FIG. 12. In block 1210, the method 1200 comprises providing a MEMS display element that is actuatable between a first state and second state. The MEMS display element has a photovoltaic structure for converting absorbed light energy into electric energy. An example embodiment of the method 1200 will be described in which the display element 900 shown in FIGS. 9A and 9B is provided in block 1210. The display element 900 has a first state where the movable element 914 is a first distance from the substrate 920 and a second state where the movable element 914 is a second distance from the substrate 920. In other embodiments of the method 1200, a different display element may be provided in block 1210 such as, for example, the display element 800, 1100, or 1175.

In block 1220 of the example embodiment of the method 1200, a first voltage is applied to the display element 900 to place the display element 900 in the first state (e.g., the relaxed state shown in FIG. 9A). The first voltage may be applied between the movable element 914 and an electrically conductive portion of the photovoltaic structure 950 such as, for example, an electrode layer (e.g., one or both of the electrode layers 952, 954 shown in FIG. 10A). In block 1230 of the method 1200, a first electric energy is generated using the photovoltaic structure 950, when the device 900 is in the first state.

In block 1240, the example embodiment of the method 1200 further comprises applying a second voltage to the display element 900 to place the display element 900 in the second state (e.g., the actuated state shown in FIG. 9B). The second voltage may be applied between the movable element 914 and an electrically conductive portion of the photovoltaic structure 950 such as, for example, an electrode layer (e.g., one or both of the electrode layers 952, 954 shown in FIG. 10A). The second voltage may be different from the first voltage. In some embodiments, the first and the second voltages are applied as described above with reference to FIGS. 3 and 4. In block 1250 of the example embodiment of the method 1200, a second electric energy is generated using the photovoltaic structure 950. The second electric energy may be different from the first electric energy. For example, in certain embodiments of the device 900, the first state corresponds to the bright state, the second state corresponds to the dark state, and significantly more electric energy (and/or electric power) is generated in the second state than in the first state.

In certain embodiments (not shown in FIG. 12), the method 1200 also includes storing at least a portion of the first electric energy, the second electric energy, or both. For example, the first and/or the second electric energies may be stored in the power supply 50 shown in FIG. 6B. The power supply 50 may comprise one or more batteries (e.g., rechargeable batteries), capacitors, or other electric storage devices. Certain embodiments of the method 1200 also include using at least a portion of the stored electric energy to apply the first voltage, the second voltage, or both to the display element 900. For example, the first and/or the second voltages may be applied by the array driver 22 shown in FIG. 6B.

Figure 13:
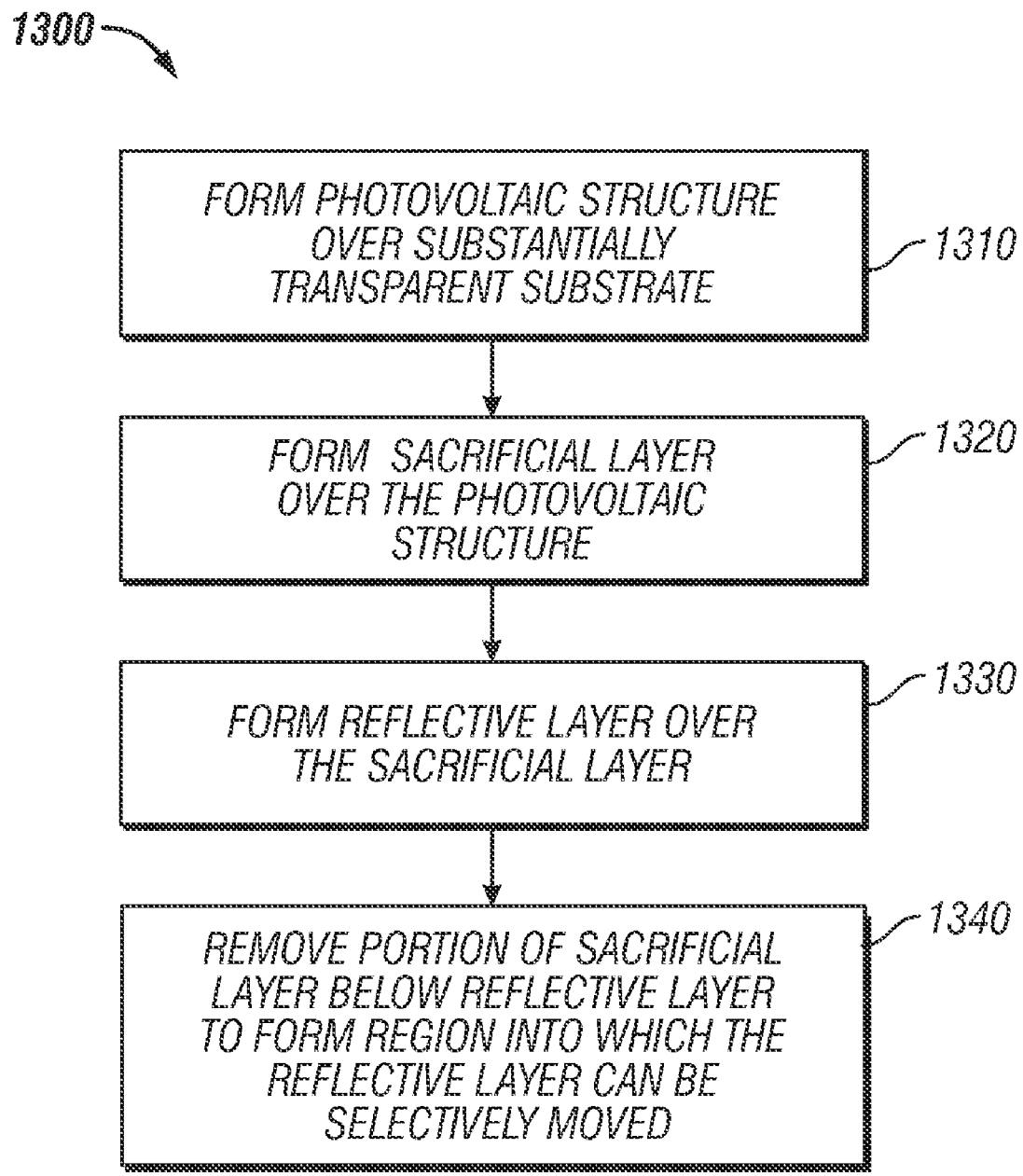
FIG. 13 is a flow diagram for an embodiment of a method of fabricating a MEMS display element.

FIG. 13 is a flow diagram that illustrates an embodiment of a method 1300 of fabricating a MEMS display element such as, for example, the MEMS display element 900 shown in FIGS. 9A and 9B. In block 1310, the method 1300 comprises forming a photovoltaic structure over a substantially transparent substrate. The substantially transparent substrate may comprise glass, plastic, or other material that is substantially transparent (or translucent) to light having the operational wavelength(s) of the MEMS display element. The substrate need not transmit all wavelengths and may absorb a portion of light at the operational wavelengths of the MEMS display element. The photovoltaic structure may be a thin film photovoltaic structure 950 such as shown in FIG. 10A. In some embodiments, forming the photovoltaic structure may comprise forming a plurality of layers including, for example, one or more electrode layers and/or electrically nonconductive (e.g., dielectric) layers. The electrically nonconductive layer may be formed over the electrode layer to prevent shorting between the movable element 914 and the electrode layer during operation of the display element. Also, the thickness of the electrically nonconductive layer may be selected to control the size of the gap 919 between the movable element 914 and the photovoltaic structure 950 when the display element 900 is in the first state.

The photovoltaic structure may include a photovoltaic cell such as the embodiments shown in FIGS. 10B and 10C. In certain embodiments, the photovoltaic cell is formed by depositing one or more thin film semiconductor layers comprising, for example, amorphous, crystalline, and/or polycrystalline silicon, cadmium telluride, cadmium sulfide, copper indium selenide (CIS), copper indium gallium selenide (CIGS), gallium arsenide, germanium (and alloys thereof), organic semiconductors, and similar materials. For example, block 1310 of the method 1300 may include forming a first semiconductor layer comprising a p-doped semiconductor and forming a second semiconductor layer comprising an n-doped semiconductor. In one example embodiment, forming the photovoltaic structure comprises forming a 35 nm thick layer of p-doped amorphous silicon and forming a 35 nm thick layer of n-doped amorphous silicon over the p-doped amorphous silicon layer. In other embodiments, the p-doped amorphous silicon layer is formed over the n-doped amorphous silicon layer. The thickness of the first layer may be approximately the same as the thickness of the second layer. In other embodiments, the thicknesses of the first layer and the second layer are different from each other.

In some embodiments, the photovoltaic cell comprises a p-i-n junction (see, e.g., FIG. 10C) and the method 1300 further includes forming a third semiconductor layer, comprising an intrinsic semiconductor. The third semiconductor layer is formed after the first layer and before the second layer so that the intrinsic semiconductor is between the p-doped and the n-doped semiconductor layers. Any of the first, the second, and the third semiconductor layers may comprise amorphous, crystalline, and/or polycrystalline silicon, cadmium telluride, cadmium sulfide, copper indium selenide (CIS), copper indium gallium selenide (CIGS), gallium arsenide, germanium (and alloys thereof), organic semiconductors, and similar materials. For example, in some embodiments, forming the photovoltaic structure comprises forming a 50 nm thick layer of n-doped amorphous silicon, forming a 200 nm thick layer of intrinsic amorphous silicon over the n-doped amorphous silicon layer, and forming a 50 nm thick layer of p-doped amorphous silicon over the intrinsic amorphous silicon layer. In other embodiments, the p-doped semiconductor layer is deposited before the intrinsic semiconductor layer and the n-doped semiconductor layer. The thicknesses of the p-doped layer, the intrinsic layer, and the n-doped layer may have different values than in the above example embodiment. For example, in some embodiments, the p-doped layer and the n-doped layer each have a thickness of about 10 nm, and the intrinsic layer has a thickness of about 50 nm. In embodiments of the MEMS display element in which the photovoltaic structure includes a metal-semiconductor Schottky junction, embodiments of the method 1300 may include forming a metal layer and forming a doped semiconductor layer so as to form the Schottky junction.

In block 1320 of the method 1300, a sacrificial layer is formed over the photovoltaic structure. The sacrificial layer may comprise a material such as molybdenum or tungsten that is etchable with an etchant such as, for example, xenon difluoride ($XeF_2$). In another embodiment, the sacrificial layer comprises a heat vaporizable material such as an organic polymer. At least a portion of the sacrificial layer is later removed (e.g., in block 1340) to form the region of the gap 919 shown in FIG. 9A. Therefore, the thickness of the sacrificial layer may be selected to provide a gap having a desired height. In some embodiments, a support structure is formed after the sacrificial layer is formed in block 1320 and before the reflective layer is formed in block 1330. The formation of the support structure may include patterning the sacrificial layer to form a support structure aperture and then depositing an electrically nonconductive material (e.g., a polymer) into the aperture to form the support structure (e.g., the posts 918 shown in FIGS. 9A-9B).

In block 1330, a reflective layer is formed over the sacrificial layer. The reflective layer may be formed by depositing a metal and/or metal alloy (e.g., aluminum and/or aluminum alloy) over the sacrificial layer. In some embodiments, block 1330 of the method 1300 also includes further patterning, masking, and/or etching steps.

In blocks 1310-1330, the formation of the photovoltaic structure, the sacrificial layer, and/or the reflective layer may be carried out using deposition techniques such as, for example, physical vapor deposition (PVD, e.g., sputtering), plasma-enhanced chemical vapor deposition (PECVD), thermal chemical vapor deposition (thermal CVD), molecular beam deposition, spin-coating, ion implantation, ion-beam assisted deposition, electroplating, and/or pulse laser deposition (PLD). In some embodiments, the sacrificial layer is deposited by printing techniques such as, for example, inkjet deposition.

In block 1340 of an embodiment of the method 1300, a portion of the sacrificial layer below the reflective layer is removed to form a region into which the reflective layer can be selectively moved during operation of the display element. Various etching methods (e.g., dry, wet, and/or plasma) may be used to remove the sacrificial layer. If the sacrificial layer comprises a heat vaporizable material, a heating device may be used to maintain a temperature sufficient to vaporize a desired amount of the sacrificial layer.

In various alternative embodiments, certain blocks of the methods 1200, 1300 are performed in a different order and/or other blocks (not shown) are substituted for the depicted blocks. For example, in some embodiments, a sacrificial layer is not used as described above, but instead the posts can be formed on the substrate and/or the photovoltaic structure, and the reflective layer can be laminated on the posts. Other variations are possible.

Although specific embodiments of interferometric modulator display elements having photovoltaic structures have been described, these embodiments are intended to be illustrative and not to limit the scope of the disclosure. Other interferometric modulators and MEMS devices also advantageously may be configured with photovoltaic structures capable of generating electrical energy from light incident on such devices. Additionally, components may be added, removed, combined, and/or arranged differently than described herein. Also, processing steps may be added, removed, combined, and/or ordered differently. Many variations are possible.

What is claimed is:

1. A display element comprising:
   a first layer at least partially transmissive of light;
   a second layer at least partially reflective of light, the second layer spaced from the first layer, the second layer selectably movable between a first position in which the display element has a first reflectivity and a second position in which the display element has a second reflectivity, the first reflectivity greater than the second reflectivity; and
   a photovoltaic element formed on the first layer or the second layer or formed between the first layer and the second layer, the photovoltaic element at least partially absorptive of light and configured to convert a portion of absorbed light into electric energy at least when the second layer is in the second position.

2. The display element of claim 1, wherein the photovoltaic element comprises a thin film photovoltaic cell.

3. The display element of claim 2, wherein the thin film photovoltaic cell comprises a semiconductor p-n junction.

4. The display element of claim 2, wherein the thin film photovoltaic cell comprises a semiconductor p-i-n structure.

5. The display element of claim 2, wherein the thin film photovoltaic cell comprises a metal-semiconductor Schottky junction.

6. The display element of claim 1, wherein the photovoltaic element comprises one or more electrode layers configured to conduct electric current from the photovoltaic element to a load.

7. The display element of claim 6, wherein the load comprises an energy storage device.

8. The display element of claim 7, wherein the energy storage device is configured to supply energy for moving the second layer between the first position and the second position.

9. The display element of claim 1, wherein the first layer and the second layer are separated by a gap when the second layer is in the first position.

10. The display element of claim 1, wherein the photovoltaic element generates a first electric energy in the first state and a second electric energy in the second state, the first electric energy less than the second electric energy.

11. The display element of claim 1, wherein an optical property of the photovoltaic element is such that the second reflectivity is less than about 30 percent of the first reflectivity.

12. The display element of claim 1, wherein the display element further comprises a mechanical support structure configured to support the second layer.

13. The display element of claim 1, further comprising:
    a display;
    a processor that is configured to communicate with the display, the processor being configured to process image data; and
    a memory device that is configured to communicate with the processor.

14. The display element of claim 13, further comprising a driver circuit configured to send at least one signal to the display.

15. The display element of claim 14, further comprising a controller configured to send at least a portion of the image data to the driver circuit.

16. The display element of claim 13, further comprising an image source module configured to send the image data to the processor.

17. The display element of claim 16, wherein the image source module comprises at least one of a receiver, transceiver, and transmitter.

18. The display element of claim 13, further comprising an input device configured to receive input data and to communicate the input data to the processor.

19. A method of generating electric energy with an electromechanical systems display element, the method comprising:
    providing a display element comprising:
       a first layer at least partially transmissive of light;
       a second layer at least partially reflective of light, the second layer spaced from the first layer, the second layer selectably movable between a first position in which the display element has a first reflectivity and a second position in which the display element has a second reflectivity, the first reflectivity greater than the second reflectivity; and
       a photovoltaic element formed on the first layer or the second layer or formed between the first layer and the second layer, the photovoltaic element at least partially absorptive of light and configured to convert a portion of absorbed light into electric energy at least when the second layer is in the second position;
    applying a first voltage to the display element to place the second layer in the first position;
    generating a first electric energy using the photovoltaic element when the second layer is in the first position;
    applying a second voltage to the display element to place the second layer in the second position; and
    generating a second electric energy using the photovoltaic element when the second layer is in the second position.

20. The method of generating electric energy of claim 19, further comprising:
    storing at least a portion of the first electric energy or the second electric energy.

21. The method of generating electric energy of claim 20, further comprising:
    using at least a portion of the stored electric energy to apply the first voltage or the second voltage to the display element.

22. A display device comprising:
    a substrate; and
    a plurality of interferometric modulators formed on the substrate, each of the interferometric modulators comprising a photovoltaic structure configured to absorb at least a portion of the light incident the interferometric modulator and, in response, to generate electric energy.

23. The display device of claim 22, wherein each interferometric modulator of the plurality of interferometric modulators has a bright state and a dark state, and the photovoltaic structure generates substantially more electric energy when the interferometric modulator is in the dark state than when the interferometric modulator is in the bright state.

24. The display device of claim 22, further comprising one or more electric energy storage devices configured to store at least a portion of the electric energy generated by the photovoltaic structures.

25. An optical display element comprising:
    means for transmitting light;
    means for partially reflecting light, the partially reflecting means spaced from the transmitting means, the partially reflecting means selectably movable between a first position in which the optical display element has a first reflectivity and a second position in which the optical display element has a second reflectivity, the first reflectivity greater than the second reflectivity; and
    means for generating electric energy, the generating means at least partially absorptive of light and configured for converting a portion of absorbed light into electric energy at least when the partially reflecting means is in the second position, the generating means formed on the transmitting means or the partially reflecting means or formed between the transmitting means and the partially reflecting means.

26. The optical display element of claim 25, wherein the transmitting means comprises a layer at least partially transmissive to light having one or more wavelengths in a range of wavelengths.

27. The optical display element of claim 25, wherein the generating means comprises a photovoltaic structure.

28. The optical display element of claim 27, wherein the photovoltaic structure comprises a thin film photovoltaic cell.

29. The optical display element of claim 25, wherein the partially reflecting means comprises a movable element configured to partially reflect light transmitted through the transmitting means.

30. The optical element of claim 25, wherein the optical display element has a first reflectivity in the first position and a second reflectivity in the second position, the first reflectivity different from the second reflectivity.

* * * * *